United States Patent
Lee et al.

(10) Patent No.: US 10,411,764 B2
(45) Date of Patent: Sep. 10, 2019

(54) APPARATUS AND METHOD FOR TRANSMITTING AND RECEIVING INFORMATION AND POWER IN WIRELESS COMMUNICATION SYSTEM

(71) Applicant: Industry-Academic Cooperation Foundation, Yonsei University, Seoul (KR)

(72) Inventors: Jang-Won Lee, Seoul (KR); Do-Yup Kim, Seoul (KR); Hyun-Suk Lee, Seongnam-si (KR); Kyeong-Won Kim, Seoul (KR)

(73) Assignee: Industry-Academic Cooperation Foundation, Yonsei University, Seoul (KR)

( * ) Notice: Subject to any disclaimer, the term of this patent is extended or adjusted under 35 U.S.C. 154(b) by 0 days.

(21) Appl. No.: 16/176,617

(22) Filed: Oct. 31, 2018

(65) Prior Publication Data

US 2019/0132028 A1 May 2, 2019

(30) Foreign Application Priority Data

Oct. 31, 2017 (KR) .......................... 10-2017-0143050
Aug. 30, 2018 (KR) .......................... 10-2018-0102849

(51) Int. Cl.
*H04B 5/00* (2006.01)
(52) U.S. Cl.
CPC .......... *H04B 5/0037* (2013.01); *H04B 5/0031* (2013.01)
(58) Field of Classification Search
CPC ........................... H04B 5/0037; H04B 5/0031
(Continued)

(56) References Cited

U.S. PATENT DOCUMENTS 5,943,606 A * 8/1999 Kremm ................ H04B 7/1855
342/358
6,788,662 B2 * 9/2004 Ozluturk ............... G06F 13/374
370/335
(Continued)

FOREIGN PATENT DOCUMENTS

KR 10-1747600 B1 6/2017
KR 10-2017-0111705 A 10/2017
(Continued)

OTHER PUBLICATIONS

B. Clerckx and E. Bayguzina, "Waveform Design for Wireless Power Transfer," in IEEE Transactions on Signal Processing, vol. 64, No. 23, pp. 6313-6328, Dec. 1, 2016.
(Continued)

*Primary Examiner* — April G Gonzales
(74) *Attorney, Agent, or Firm* — Jefferson IP Law, LLP

(57) ABSTRACT

The transmitting and receiving information and power in a wireless communication system are provided. A transmitting apparatus includes a transceiver, and at least one processor coupled with the transceiver. The at least one processor is configured to generate a symbol including a first set of signals for transferring power and a first information value or a second set of signals for transferring power and a second information value, and transmit the symbol. The first information and the second information may be indicated by a result value determined based on a predefined rule on the basis of a first value acquired by forwardly rectifying the symbol and a second value acquired by reversely rectifying the symbol. Each of the first value and the second value may be determined based on at least one of frequencies, magnitudes, or phases of the signals included in the symbol.

19 Claims, 38 Drawing Sheets

(58) Field of Classification Search
USPC ........................................................ 455/41.1
See application file for complete search history.

(56) References Cited

U.S. PATENT DOCUMENTS

| | | | | | |
|---|---|---|---|---|---|
| 8,149,879 | B2* | 4/2012 | Rogerson | ............. | H03K 3/0315 |
| | | | | | 370/330 |
| 8,218,491 | B2* | 7/2012 | Lee | ...................... | H04W 72/02 |
| | | | | | 370/329 |
| 8,934,447 | B2* | 1/2015 | Lee | .................... | H04W 72/044 |
| | | | | | 370/330 |
| 9,641,224 | B2* | 5/2017 | Gong | .................. | H04B 5/0037 |
| 2002/0036996 | A1* | 3/2002 | Ozluturk | ............ | H03H 17/0226 |
| | | | | | 370/335 |
| 2003/0092456 | A1* | 5/2003 | Dent | .................... | H04B 7/0615 |
| | | | | | 455/503 |
| 2013/0035034 | A1* | 2/2013 | Kim | ................... | H04B 5/0037 |
| | | | | | 455/41.1 |
| 2013/0035126 | A1* | 2/2013 | Kim | ...................... | H02J 5/005 |
| | | | | | 455/509 |
| 2013/0058379 | A1* | 3/2013 | Kim | .................... | H04B 5/0031 |
| | | | | | 375/146 |
| 2013/0058380 | A1* | 3/2013 | Kim | ...................... | H04W 76/14 |
| | | | | | 375/146 |
| 2014/0080501 | A1* | 3/2014 | Lee | .................. | H04W 72/0453 |
| | | | | | 455/454 |
| 2017/0013495 | A1* | 1/2017 | Chae | ..................... | H04W 76/14 |
| 2017/0288473 | A1* | 10/2017 | Choi | ....................... | H02J 50/80 |
| 2017/0310380 | A1* | 10/2017 | Kim | ....................... | H04B 7/155 |
| 2018/0026820 | A1* | 1/2018 | Kim | ....................... | H02J 50/20 |
| | | | | | 375/259 |

FOREIGN PATENT DOCUMENTS

| | | |
|---|---|---|
| KR | 10-1829625 B1 | 2/2018 |
| WO | 2015/038070 A1 | 3/2015 |
| WO | 2017/041858 A1 | 3/2017 |

OTHER PUBLICATIONS

S. Claessens, N. Pan, M. Rajabi, D. Schreurs, and S. Pollin, "Enhanced Biased ASK Modulation Performance for SWIPT With AWGN Channel and Dual-Purpose Hardware," in IEEE Transactions on Microwave Theory and Techniques, vol. 66, No. 7, pp. 3478-3486, Jul. 2018.

* cited by examiner (Related Act)

(Related Act)

(Related Act)

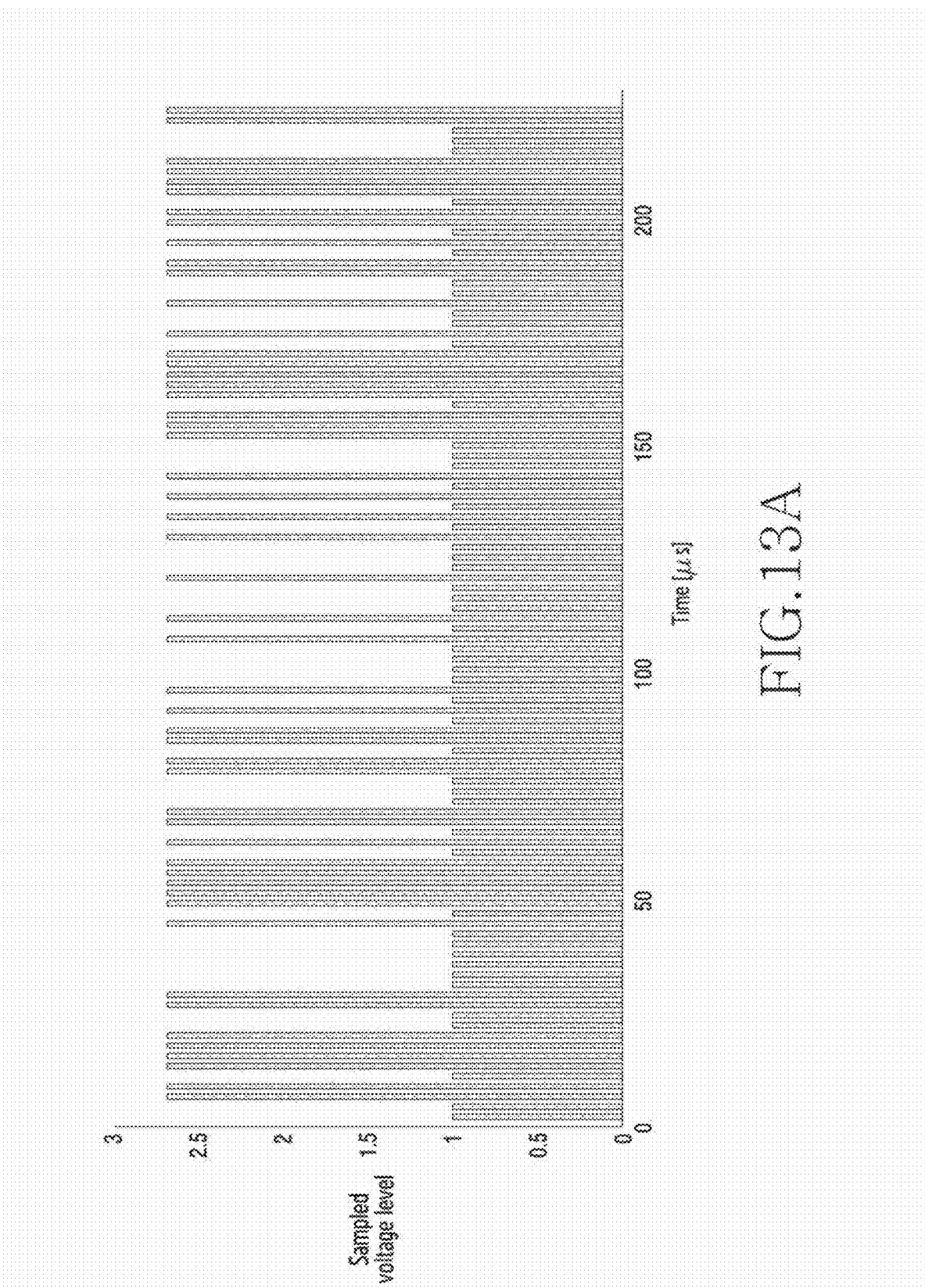

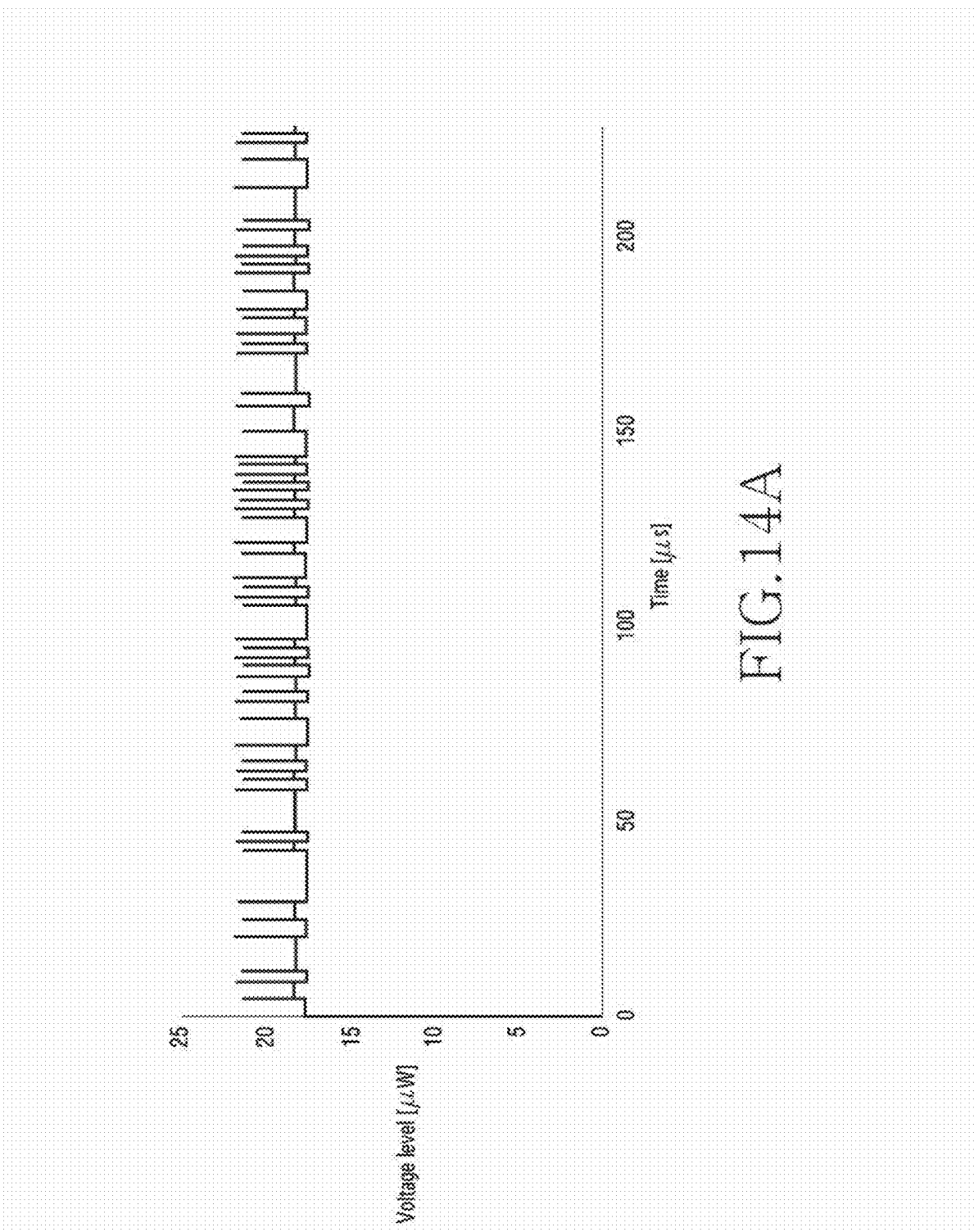

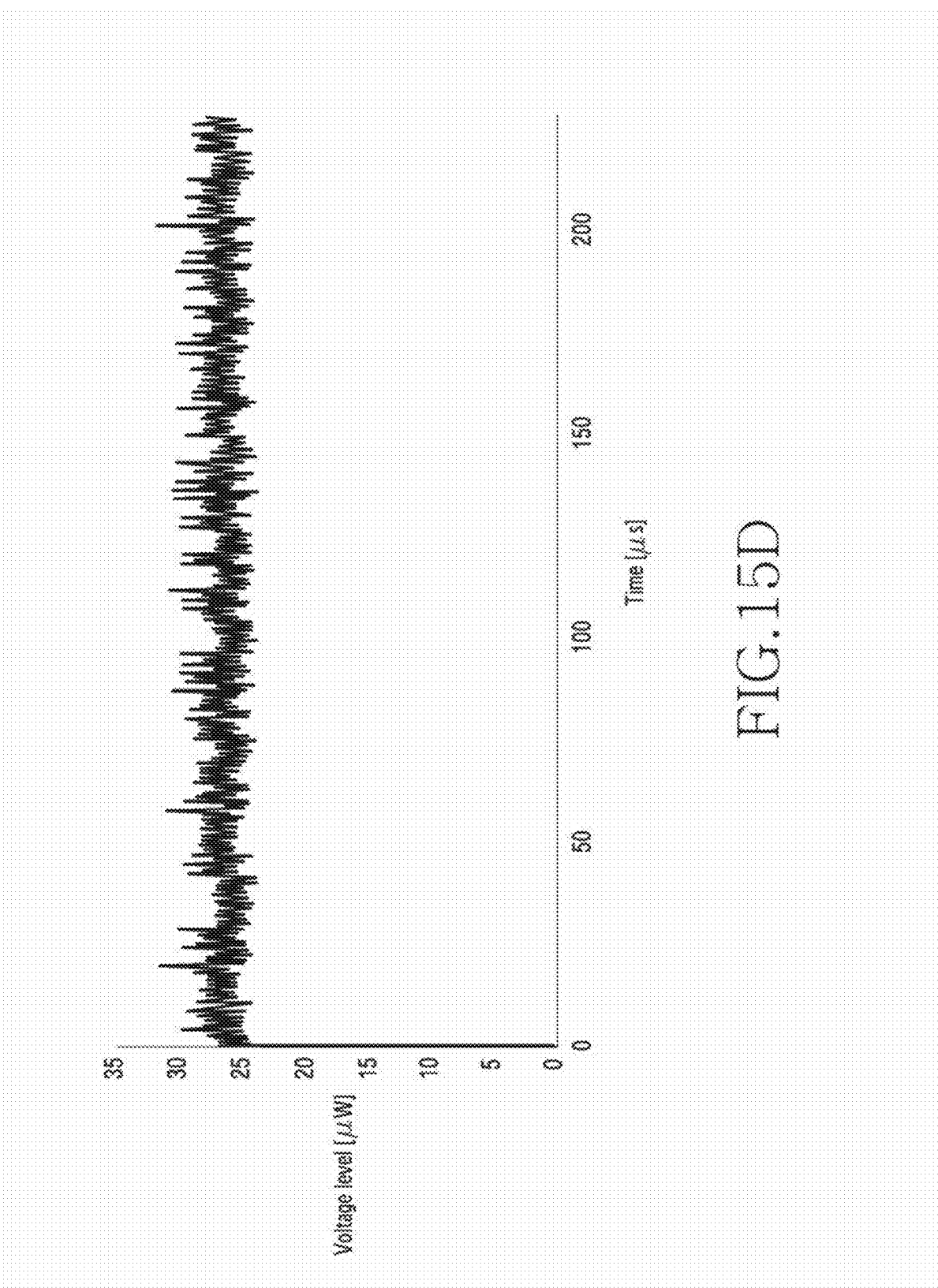

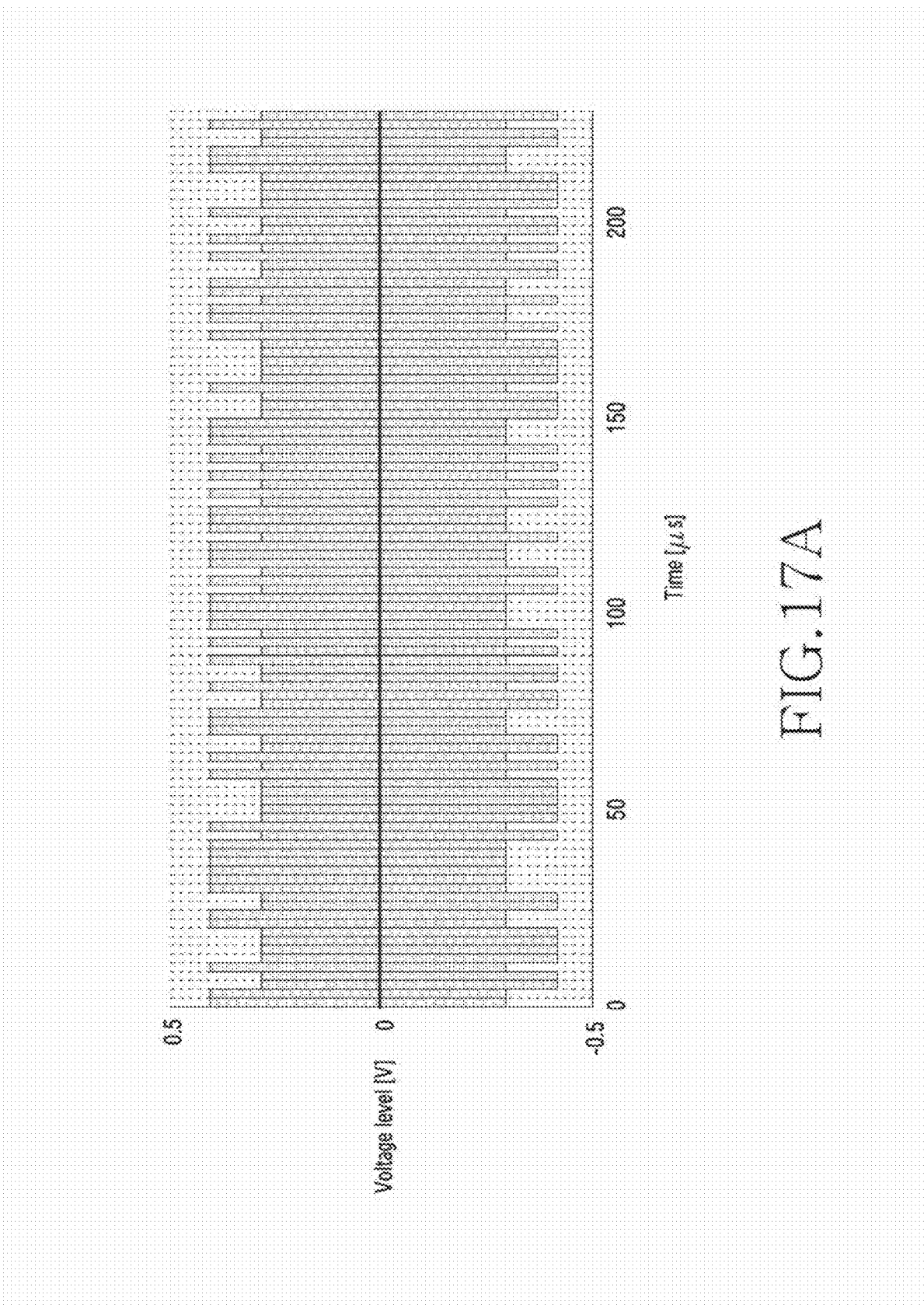

APPARATUS AND METHOD FOR TRANSMITTING AND RECEIVING INFORMATION AND POWER IN WIRELESS COMMUNICATION SYSTEM

CROSS REFERENCE TO RELATED APPLICATION(S)

This application is based on and claims priority under 35 U.S.C. § 119(a) of a Korean patent application number 10-2017-0143050, filed on Oct. 31, 2017 and under 35 U.S.C. § 119(a) of a Korean patent application number 10-2018-0102849 filed on, Aug. 30, 2018, in the Korean Intellectual Property Office, the disclosure of each of which is incorporated by reference herein in its entirety.

BACKGROUND

1. Field

The disclosure relates to a wireless communication system. More particularly, the disclosure relates to an apparatus and method for transmitting and receiving information and power in a wireless communication system.

2. Description of the Related Art

In a Simultaneous wireless information and power transfer (SWIPT) system, specific power is used to extract information by using a power divider to simultaneously transmit information, and the remaining power is used for power charging. Since this method cannot use the entire power in the power charging, there is ongoing discussion on a method for power charging by converting all signals into direct current (DC) signals.

When power is charged by converting all signals into DC signals, information is extracted through modulation. FIGS. 1A, 1B, and 1C are drawings for explaining a typical signal modulation scheme. FIG. 1A illustrates an example of a frequency modulation (FM) scheme, FIG. 1B illustrates an example of a phase modulation (PM) scheme, and FIG. 1C illustrates an example of an amplitude modulation (AM) scheme.

Referring to FIGS. 1A to 1C, signals of different waveforms are generated according to an information value. Meanwhile, when the generated signal is converted into a DC signal, a signal indicated by a bold line is generated.

Referring to FIG. 1A to FIG. 1C, in case of the FM and the PM, when power is charged by converting all signals into DC signals, both a first symbol and a second symbol are converted into signals having the same magnitude, and thus information is not distinguished. On the other hand, in case of the AM, the first symbol and the second symbol have different signal magnitudes even if the symbols are subjected to DC conversion, and thus information is distinguished. However, in case of the AM, since a power value of the signal converted into the DC signal is not constant, maximum power is not always transferred.

The above information is presented as background information only to assist with an understanding of the disclosure. No determination has been made, and no assertion is made, as to whether any of the above might be applicable as prior art with regard to the disclosure.

SUMMARY

Aspects of the disclosure are to address at least the above-mentioned problems and/or disadvantages and to provide at least the advantages described below. Accordingly, an aspect of the disclosure is to provide an apparatus and method for effectively transmitting information and power in a wireless communication system.

Another aspect of the disclosure is to provide an apparatus and method for maximizing power transmitted together with information in a wireless communication system.

Additional aspects will be set forth in part in the description which follows and, in part, will be apparent from the description, or may be learned by practice of the presented embodiments.

In accordance with an aspect of the disclosure, a transmitting apparatus in a wireless communication system is provided. The apparatus includes a transceiver, and at least one processor coupled with the transceiver. The at least one processor is configured to generate a symbol including a first set of signals for transferring power and a first information value or a second set of signals for transferring power and a second information value, and transmit the symbol. The first information and the second information are indicated by a result value determined based on a predefined rule on the basis of a first value acquired by forwardly rectifying the symbol and a second value acquired by reversely rectifying the symbol. Each of the first value and the second value is determined based on at least one of frequencies, magnitudes, or phases of the signals included in the symbol.

In accordance with an aspect of the disclosure, a receiving apparatus in a wireless communication system is provided. The apparatus includes a transceiver, and at least one processor coupled with the transceiver. The at least one processor is configured to receive a symbol including a first set of signals for transferring power and a first information value or a second set of signals for transferring power and a second information value, detect the first information or the second information from the symbol, and harvest the power from the symbol. The first information and the second information are indicated by a result value determined based on a predefined rule on the basis of a first value acquired by forwardly rectifying the symbol and a second value acquired by reversely rectifying the symbol. Each of the first value and the second value is determined based on at least one of frequencies, magnitudes, or phases of the signals included in the symbol.

In accordance with an aspect of the disclosure, a method of operating a transmitting apparatus in a wireless communication system is provided. The method includes generating a symbol including a first set of signals for transferring power and a first information value or a second set of signals for transferring power and a second information value, and transmitting the symbol. The first information and the second information are indicated by a result value determined based on a predefined rule on the basis of a first value acquired by forwardly rectifying the symbol and a second value acquired by reversely rectifying the symbol. Each of the first value and the second value is determined based on at least one of frequencies, magnitudes, or phases of the signals included in the symbol.

In accordance with an aspect of the disclosure, a method of operating a receiving apparatus in a wireless communication system is provided. The method includes receiving a symbol including a first set of signals for transferring power and a first information value or a second set of signals for transferring power and a second information value, detecting the first information or the second information from the symbol, and harvesting the power from the symbol. The first information and the second information are indicated by a result value determined based on a predefined rule on the basis of a first value and second value of the symbol. Each of the first value and the second value is determined based on at least one of frequencies, magnitudes, or phases of the signals included in the symbol.

An apparatus and method according to various embodiments of the disclosure deliver information by using phase modulation (PM) and a magnitude ratio of signals having different frequencies, thereby maximizing power transmitted together with the information.

Advantages acquired in the disclosure are not limited to the aforementioned advantages. Other advantages not mentioned herein can be clearly understood by those skilled in the art to which the disclosure pertains from the following descriptions.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which:

FIGS. 13A and 13B illustrate an example of function result values for a transmission signal based on a modulation scheme and function result values for a transmission signal based on ASK according to an embodiment of the disclosure;

FIGS. 14A and 14B illustrate an example of power that can be used to harvest energy acquired from a transmission signal and power that can be used to harvest energy acquired from a transmission signal based on ASK according to an embodiment of the disclosure;

FIGS. 15A, 15B, 15C, and 15D illustrate characteristics of a transmission signal based on a modulation scheme according to an embodiment of the disclosure;

FIGS. 17A, 17B, and 17C illustrate examples of transmission symbols according to various embodiments of the disclosure;

Throughout the drawings, it should be noted that like reference numbers are used to depict the same or similar elements, features, and structures.

DETAILED DESCRIPTION

Figure 1A:
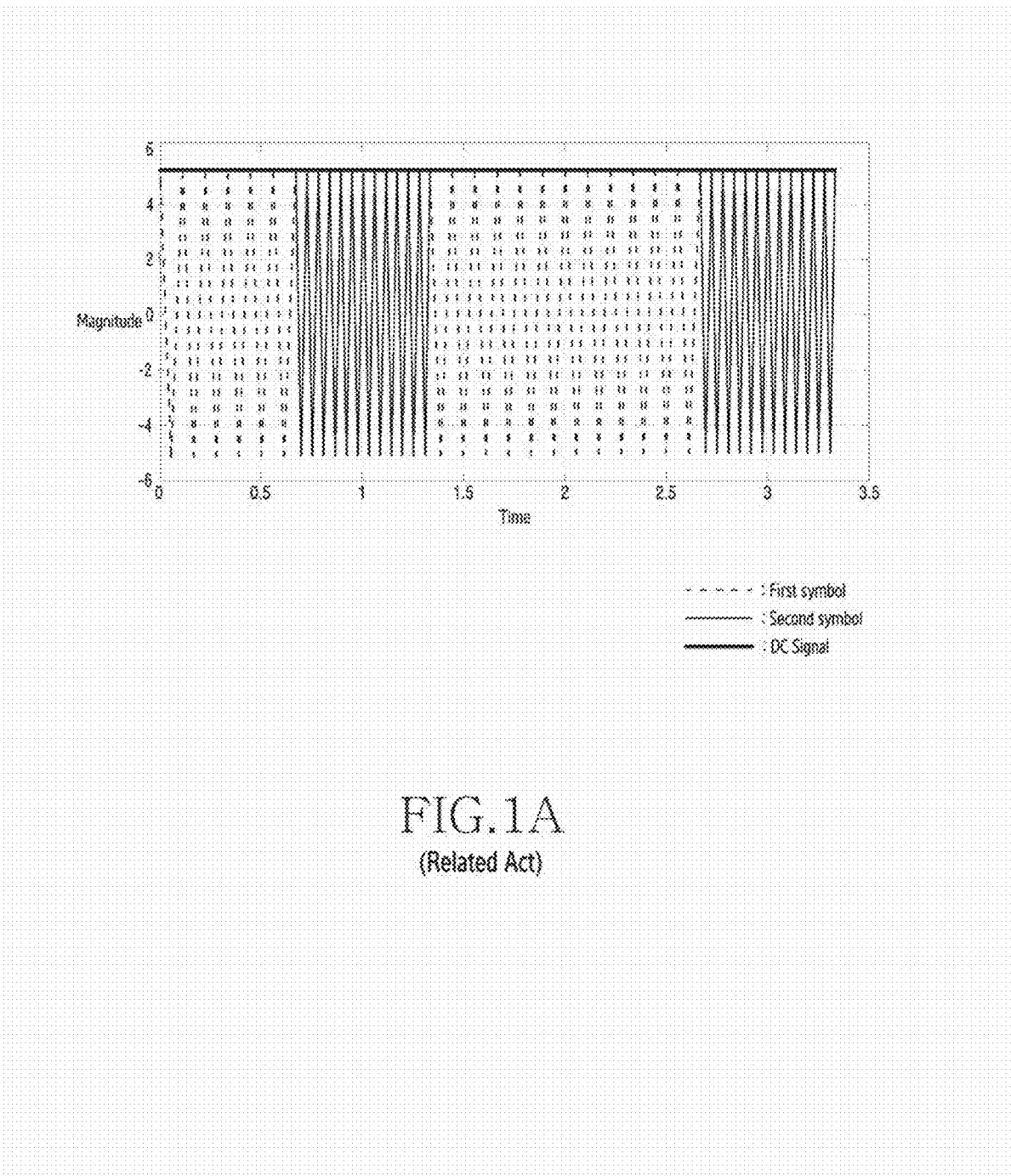
FIGS. 1A, 1B, and 1C are drawings for explaining a typical signal modulation scheme according to the related art.
Figure 1B:
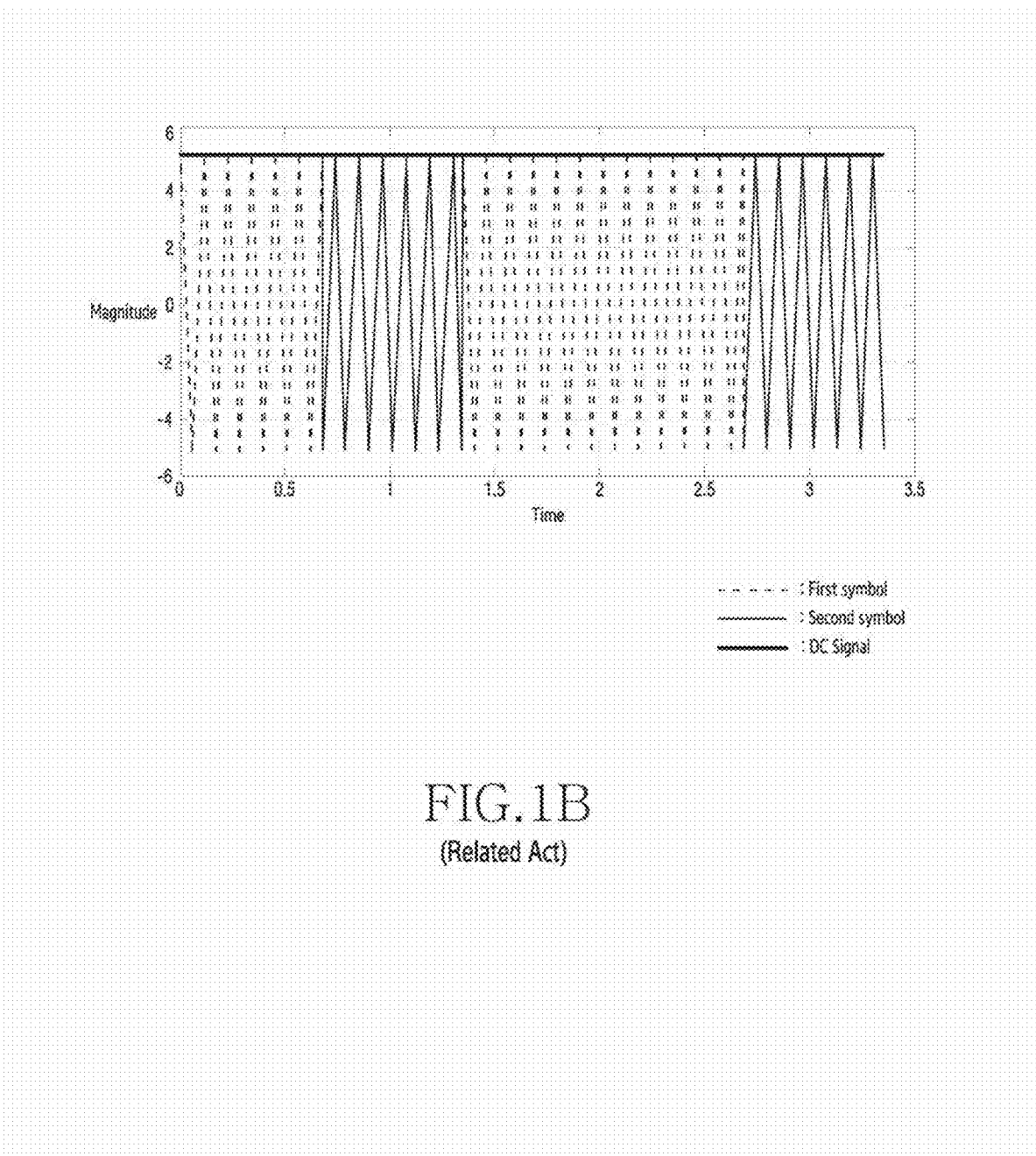
Figure 1C:
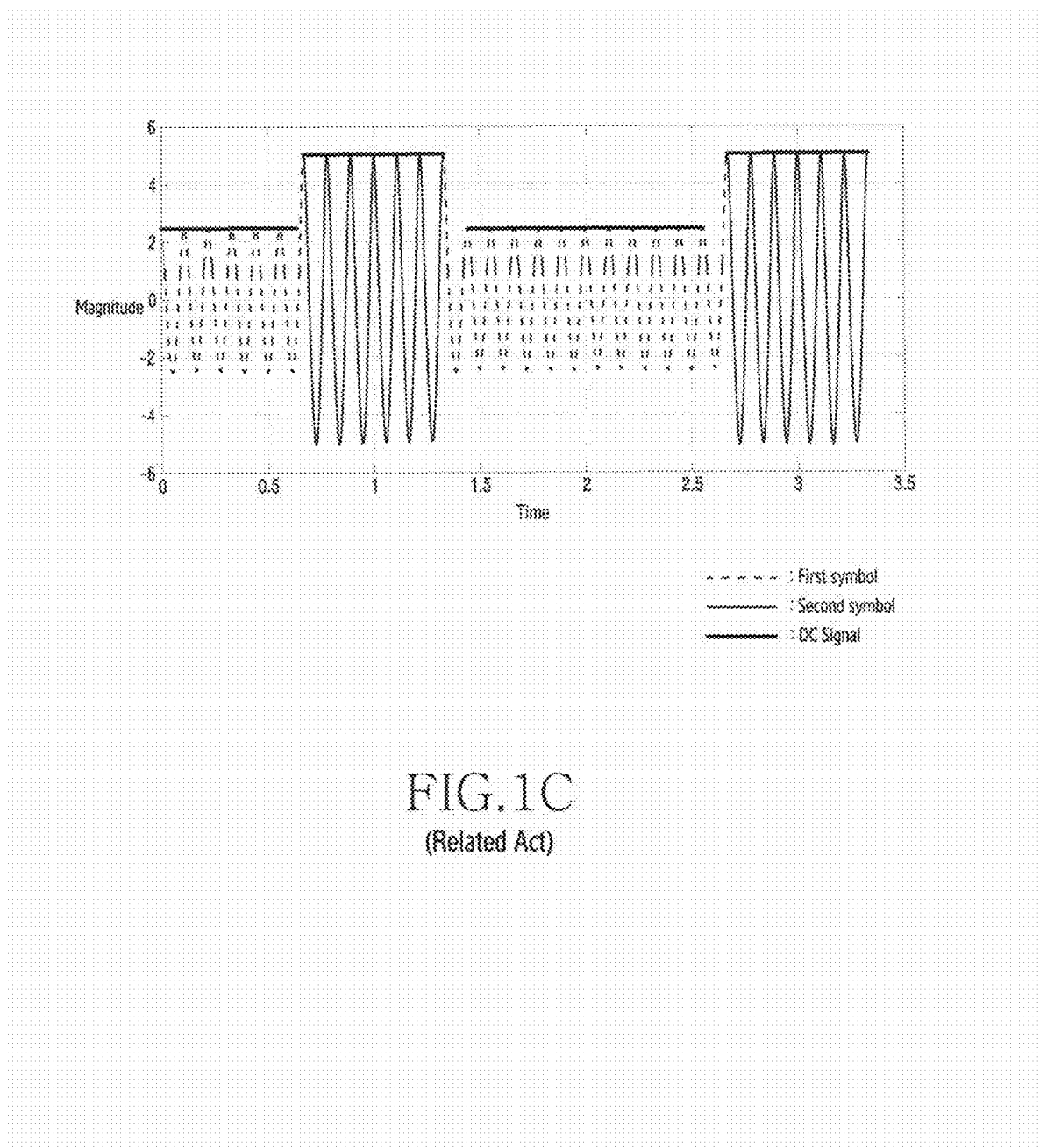

The following description with reference to the accompanying drawings is provided to assist in a comprehensive understanding of various embodiments of the disclosure as defined by the claims and their equivalents. It includes various specific details to assist in that understanding, but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but are merely used by the inventor to enable a clear and consistent understanding of the disclosure. Accordingly, it should be apparent to those skilled in the art that the following description of various embodiments of the disclosure is provided for illustration purposes only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Terms used in the disclosure are for the purpose of describing particular embodiments only and are not intended to limit other embodiments. A singular expression may include a plural expression unless there is a contextually distinctive difference. Unless otherwise defined, all terms (including technical and scientific terms) used herein have the same meaning as commonly understood by those ordinarily skilled in the art disclosed in the disclosure. It will be further understood that terms, such as those defined in commonly used dictionaries, should be interpreted as having a meaning that is consistent with their meaning in the context of the relevant art, and will not be interpreted in an idealized or overly formal sense unless expressly so defined herein. Optionally, the terms defined in the disclosure should not be interpreted to exclude the embodiments of the disclosure.

A hardware-based approach is described as an example in the various embodiments of the disclosure described hereinafter. However, since the various embodiments of the disclosure include a technique in which hardware and software are both used, a software-based approach is not excluded in the embodiments of the disclosure.

The disclosure relates to an apparatus and method for transmitting and receiving information and power in a wireless communication system. Specifically, the disclosure describes a technique for improving efficiency of the power transmitted together with the information in the wireless communication system.

Terms used hereinafter to refer to a signal, a channel, control information, and network entities, a component of a device, or the like are exemplified for convenience of explanation. Therefore, the disclosure is not limited to the terms described below, and thus other terms have the same technical meaning may also be used.

Figure 2:
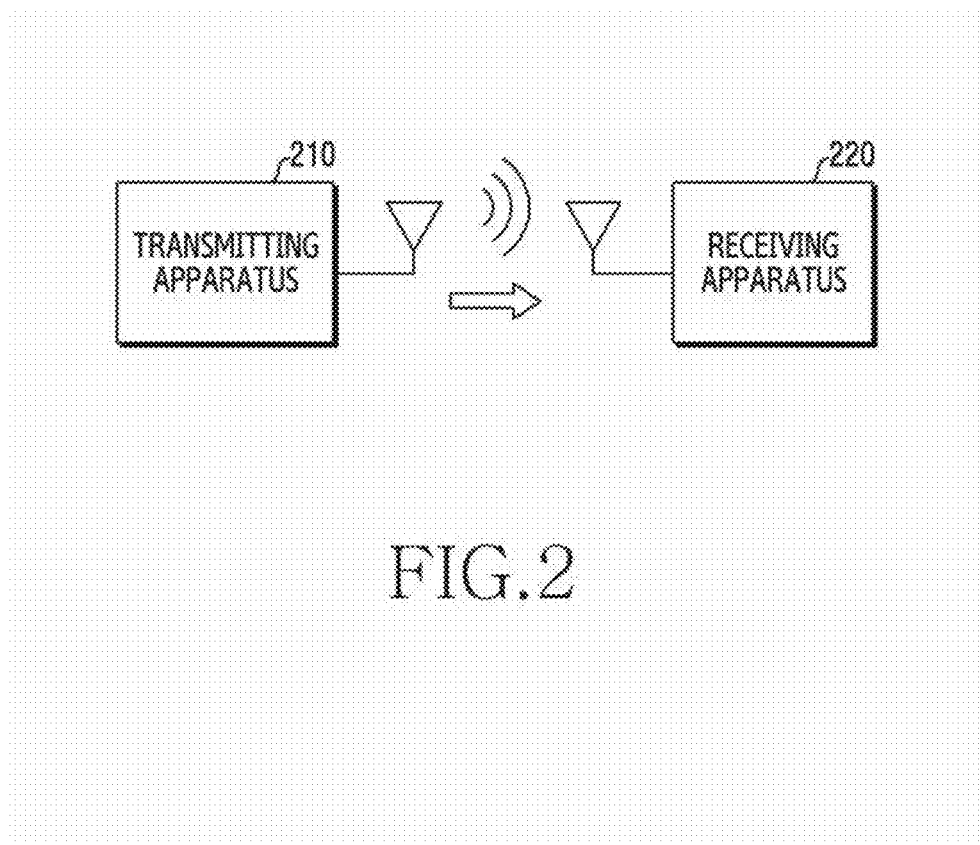
FIG. 2 illustrates a transmitting apparatus and receiving apparatus for respectively simultaneously transmitting and receiving wireless information and power according to an embodiment of the disclosure.

FIG. 2 illustrates a transmitting apparatus and receiving apparatus for respectively simultaneously transmitting and receiving wireless information and power according to various embodiments of the disclosure.

Referring to FIG. 2, a transmitting apparatus 210 (e.g., a transmitter) generates a transmission signal to simultaneously transmit information and power. The transmission signal generated by the transmitting apparatus 210 is constructed of a sum of sinusoidal waves, and may be expressed by Equation 1 below.

$$s(t) = \sum_{k=1}^{K} A_k \cos(2\pi f_k t + \theta_k) \quad \text{Equation 1}$$

In Equation 1, s(t) denotes a transmission signal, K denotes the number of sinusoidal waves to be added, $A_k$ denotes a magnitude of a k-th sinusoidal wave, $f_k$ denotes a frequency of the k-th sinusoidal wave, and $\theta_k$ denotes a phase of the k-th sinusoidal wave.

A specific transmission signal may be generated by adjusting a phase, magnitude, and frequency of each sinusoidal wave. If one symbol period of the transmission signal is denoted by T, the transmission signal s(t) may express one element of information during the symbol period T.

The transmission signal is received in a receiving apparatus 220, and thereafter is rectified forwardly and backwardly. A magnitude $s^+_{dc}$ of a forwardly rectified DC signal and a magnitude $s^-_{dc}$ of a backwardly rectified DC signal are dependent on the transmission signal s(t). In order for the receiving apparatus 220 to correctly detect information, a transmission signal may be generated such that a result value of a function $f(s^+_{dc}, d^-_{dc})$ for detecting information differs according to each piece of information, for example, is one-to-one mapped. The function for detecting the information may be referred to as an 'information detection function, an 'information mapping rule, a 'rule', a 'function', or the like.

For example, a value of information may be expressed by a ratio of $s^+_{dc}$ and $s^-_{dc}$. In this case, s(t) based on each element of information may be defined to have a different value of $f(s^+_{dc}, s^-_{dc}) = s^+_{dc}/s^-_{dc}$. Herein, the magnitude $s^+_{dc}$ of the forwardly rectified signal and the magnitude $s^-_{dc}$ of the backwardly rectified signal may be understood as a maximum value and minimum value of the transmission signal s(t). In general, the maximum value and the minimum value imply an upper peak value and a lower peak value. However, in the present disclosure, the maximum value and the minimum value may be understood as values in a specific range from the upper peak value and the lower peak value. In order to simultaneously transmit information and power, the transmission signal may be set such that a ratio of the maximum value and the minimum value varies depending on the value of information to be transmitted. For example, the transmission signal may be generated by a sum of two sinusoidal waves having different frequencies, and a phase and amplitude of each sinusoidal wave may be set differently according to the value of information to be transmitted.

In addition, for effective energy harvesting, a signal with power as high as possible is preferably received in the receiving apparatus 200. For this, the transmission signal may be generated to satisfy Equation 2 below.

$$P_T = \frac{1}{T} \int_0^T |s(t)|^2 dt \quad \text{Equation 2}$$

In Equation 2, $P_T$ denotes maximum average power that can be output, T denotes a symbol period of a transmission signal, and s(t) denotes the transmission signal.

The receiving apparatus (e.g., a receiver) 220 receives the transmission signal transmitted from the transmitting apparatus 210 for simultaneously transmitting wireless information and power. Upon receiving the transmission signal, the receiving apparatus 220 detects information from the received signal and harvests energy. The receiving apparatus 220 may include a forward rectifier for forwardly rectifying a signal and a backward rectifier for backwardly rectifying the signal. Structures of the forward rectifier and the backward rectifier may change variously. The received signal is converted into a DC signal having a magnitude of $s^+_{dc}$ via the forward rectifier, and also is converted into a DC signal having a magnitude of $s^-_{dc}$ via the backward rectifier. When an ideal situation, in which a voltage drop caused by a diode and a ripple phenomenon caused by capacitor charging and discharging are not considered, is taken into consideration, signals having the maximum value and minimum value of the signal s(t) constructed of a combination of high frequency sinusoidal waves are output as a DC signal rectified forwardly and a DC signal rectified backwardly.

The magnitude of the forward and backward rectified signal may be expressed by Equation 3 below.

$$s^+_{dc} = |\max_{t \in [0,T)} \{s(t)\}|$$

$$s^-_{dc} = |\min_{t \in [0,T)} \{s(t)\}| \quad \text{Equation 3}$$

In Equation 3, s(t) denotes a transmission signal, $s^+_{dc}$ denotes a magnitude of a signal acquired by forwardly rectifying the transmission signal, $s^-_{dc}$ denotes a magnitude of a signal acquired by backwardly rectifying the transmission signal, and T denotes a symbol period.

Since a unique value of $f(s^+_{dc}, s^-_{dc})$ is defined according to information, the receiving apparatus 220 may detect the information transmitted from the transmitting apparatus 210 through the value of $f(s^+_{dc}, s^-_{dc})$. In addition, when values $s^+_{dc}$ and $s^-_{dc}$ are defined, a physical phenomenon based on impedance matching, a diode, a capacitor, a load resister, or the like may be further taken into consideration. Ideally, the transmitting apparatus 210 may expect that the maximum and minimum values of the transmission signal are $s^+_{dc}$ and $s^-_{dc}$ acquired through rectification in the receiving apparatus 220. However, there may be a difference between the maximum value or minimum value of the transmission signal and $s^+_{dc}$ or $s^-_{dc}$ acquired in the receiving apparatus 220. Therefore, in consideration of a loss in the receiving apparatus 220, the transmitting apparatus 210 may increase a predictability of the values $s^+_{dc}$ or $s^-_{dc}$ acquired by rectifying the transmission signal through pre-compensation or the like.

In the energy harvesting, energy is harvested from both ends of a DC signal acquired through forward rectification and a DC signal acquired through backward rectification. Since an electric potential difference of the two DC signals is $s^-_{dc} + d^-_{dc}$, energy is harvested from a DC signal having an amplitude of $s^+_{dc} + s^-_{dc}$. For example, when information is expressed by a magnitude ratio of rectified signals, the receiving apparatus 220 generates a first rectified signal and a second rectified signal by forwardly and backwardly rectifying the received signal. Since the ratio of the first rectified signal and the second rectified signal is equal to the ratio of the maximum value and minimum value of the transmission signal transmitted from the transmitting apparatus 210 for simultaneously transmitting wireless information and power, the receiving apparatus 220 may determine a value of transmission information by using the ratio of the first rectified signal and the second rectified signal, and may charge power by using an electric potential difference of the first rectified signal and the second rectified signal.

Figure 3:
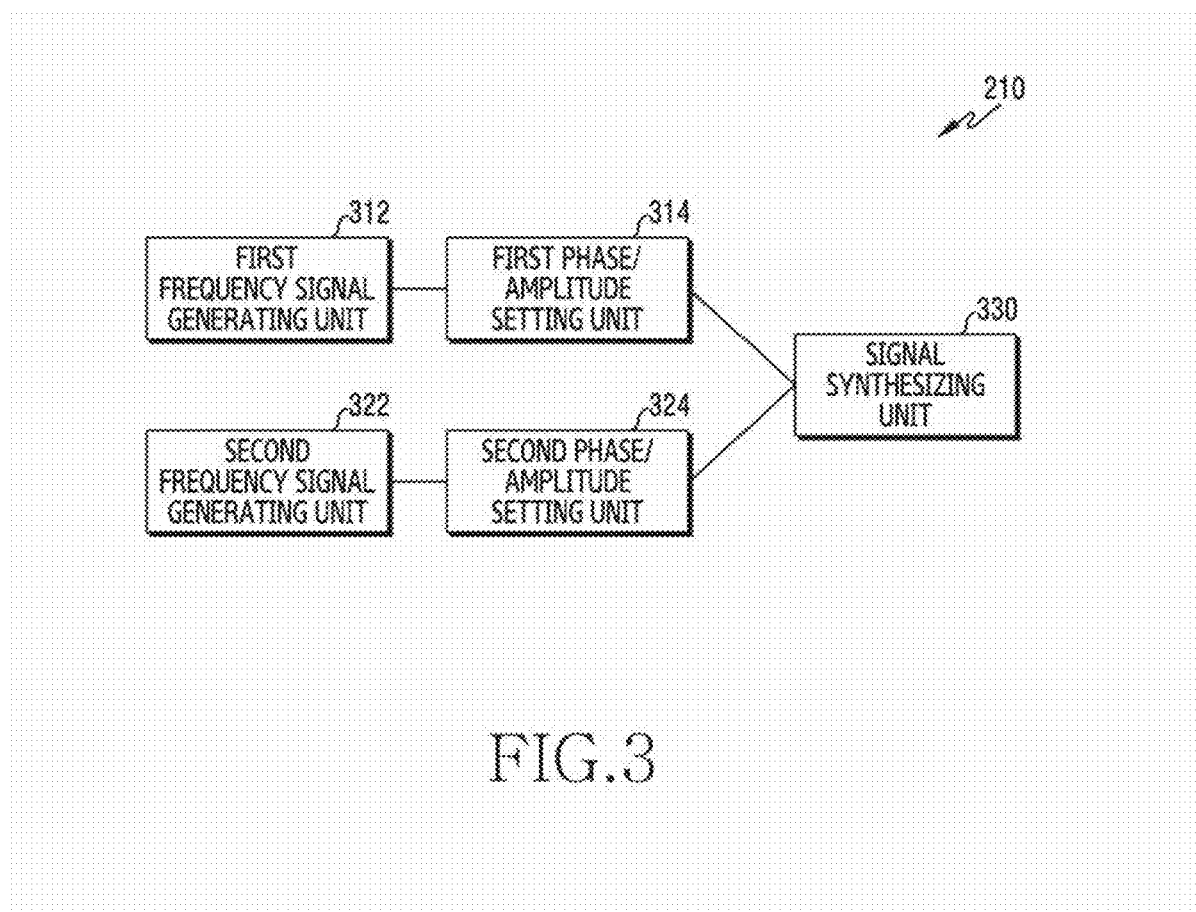
FIG. 3 illustrates a structure of a transmitting apparatus for simultaneously transmitting wireless information and power according to an embodiment of the disclosure.

FIG. 3 illustrates a structure of a transmitting apparatus for simultaneously transmitting wireless information and power according to an embodiment of the disclosure. The structure of the transmitting apparatus 210 is exemplified in FIG. 3.

Referring to FIG. 3, the transmitting apparatus 210 may include a first frequency signal generating unit 312, a first phase/amplitude setting unit 314, a second frequency signal generating unit 322, a second phase/amplitude setting unit 324, and a signal synthesizing unit 330.

The first frequency signal generating unit 312 may generate a first frequency signal which is a sinusoidal wave, and the second frequency signal generating unit 322 may generate a second frequency signal which is a sinusoidal wave. The first frequency signal and the second frequency signal may be set to have different frequencies, so that a maximum value and minimum value of a transmission signal generated by synthesizing the first frequency signal and the second frequency signal have different values.

The first phase/amplitude setting unit 314 may set a phase or amplitude of the first frequency signal according to a value of information to be transmitted, and the second phase/amplitude setting unit 324 may set a phase or amplitude of the second frequency signal according to the value of information to be transmitted. Transmission power of the signal may be expressed by Equation 4 below.

$$P_T = \frac{1}{T}\int_0^T |A_1\cos(2\pi f_1 t + \theta_1) + A_2\cos(2\pi f_2 t + \theta_2)|^2 dt \quad \text{Equation 4}$$

In Equation 4, T denotes a period of a transmission symbol, and $P_T$ denotes maximum average power that can be output during the period T. $A_1$, $f_1$, and $\theta_1$ denote an amplitude, frequency, and phase of a first frequency signal, and $A_2$, $f_2$, and $\theta_2$ denote an amplitude, frequency, and phase of a second frequency signal.

The first phase/amplitude setting unit 314 and the second phase/amplitude setting unit 324 may set a phase or amplitude of the first frequency signal and second frequency signal so that maximum power is transmitted regardless of which information is transmitted, thereby allowing the receiving apparatus 220 to receive a signal of maximum power.

In addition, the first phase/amplitude setting unit 314 and the second phase/amplitude setting unit 324 may set the phase or amplitude of the first frequency signal and the second frequency signal so that a ratio of a maximum value and minimum value of a transmission signal acquired by synthesizing the first frequency signal and the second frequency signal varies depending on a value of information to be transmitted.

The signal synthesizing unit 330 may generate the transmission signal by synthesizing the first frequency signal and the second frequency signal.

FIG. 3 illustrates a structure for a case where a transmission signal is defined as a sum of two sinusoidal waves. According to another embodiment, when the transmission signal is defined as a sum of three or more sinusoidal waves, at least one frequency signal generating unit and at least one phase/amplitude setting unit may be further included. Alternatively, at least one of the first frequency signal generating unit 312 and the second frequency signal generating unit 322 may generate a signal of a different frequency, and at least one of the first phase/amplitude setting unit 314 and the second phase/amplitude setting unit 324 may adjust a phase and amplitude of the signal of the different frequency.

The first frequency signal generating unit 312, first phase/amplitude setting unit 314, second frequency signal generating unit 322, second phase/amplitude setting unit 324, and signal synthesizing unit 330 of FIG. 3 may be implemented by at least one processor. In addition, a transceiver including an intermediate frequency (IF) or radio frequency (RF) circuit may be further included to transmit a transmission signal generated by the signal synthesizing unit 330. The at least one processor may control the transmitting apparatus 210 to perform various operations described below.

Figure 4:
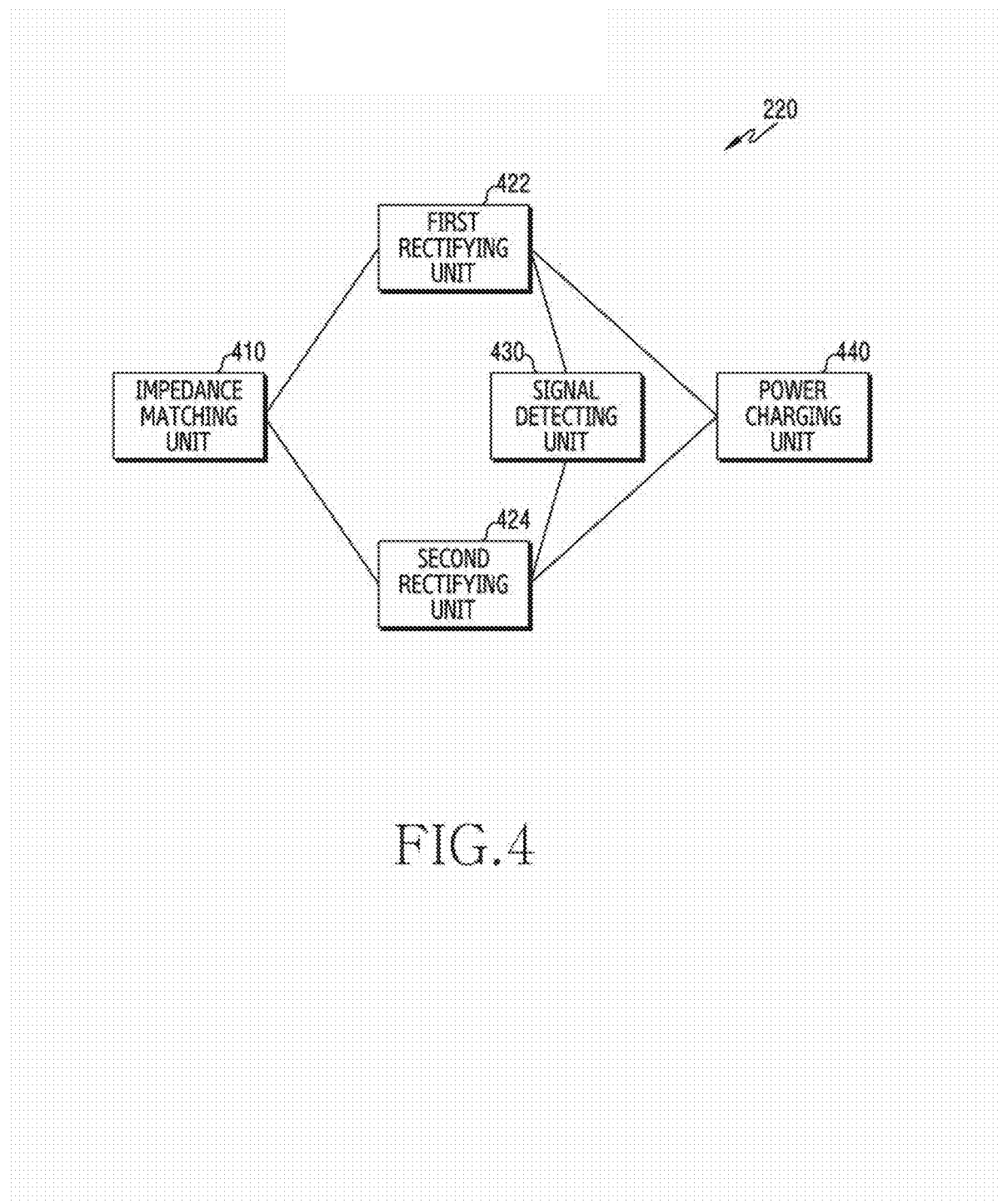
FIG. 4 illustrates a structure of a receiving apparatus for simultaneously receiving wireless information and power according to an embodiment of the disclosure.

FIG. 4 illustrates a structure of a receiving apparatus for simultaneously receiving wireless information and power according to an embodiment of the disclosure.

Referring to FIG. 4, the receiving apparatus 220 may include an impedance matching unit 410, a first rectifying unit 422, a second rectifying unit 424, a signal detecting unit 430, and a power charging unit 440.

The impedance matching unit 410 matches impedance of a reception signal. When the impedance is not matched, a high-frequency signal is lost significantly due to signal reflection. Thus, the impedance matching unit 410 may decrease the loss of the reception signal through impedance matching.

The first rectifying unit 422 may generate a first rectified signal by forwardly rectifying the reception signal, and the second rectifying unit 424 may generate a second rectified signal by backwardly rectifying the reception signal. Each of the first rectifying unit 422 and the second rectifying unit 424 may include a diode and a low-band filter to rectify the reception signal. The first rectifying unit 422 may detect an envelope of a maximum value of the reception signal, and the second rectifying unit 424 may detect an envelope of a minimum value of the reception signal. For example, the first rectifying unit 422 may generate a first rectified signal corresponding to the envelope of the maximum value by forwardly rectifying the reception signal, and the second rectifying unit 424 may generate a second rectified signal corresponding to the envelope of the minimum value by backwardly rectifying the reception signal.

The signal detecting unit 430 may determine an information value of the reception signal by using a magnitude ratio of the first rectified signal and the second rectified signal. The power charging unit 440 may charge power by using an electric potential difference of the first rectified signal and the second rectified signal. Since the power charging unit 440 uses the electric potential difference of the first rectified signal and the second rectified signal, power can be charged in a relatively constant amount regardless of an information value to be received. Although not shown in FIG. 4, the power charging unit 440 may provide charging current to a battery. Herein, the battery may be part of the power charging unit 440, or may be a separate component of the power charging unit 440.

As described above, the transmitting apparatus for simultaneously transmitting wireless information and power transmits a transmission signal acquired by synthesizing two or more sinusoidal waves, and the receiving apparatus for simultaneously receiving wireless information and power uses forward and backward rectification. Thus, information and power can be simultaneously transmitted and received, and maximum power can consistently be transmitted and received.

According to the aforementioned embodiment, the receiving apparatus 220 may determine a value of information after receiving the transmission signal transmitted from the transmitting apparatus 210, and may charge power. The transmission signal is generated by a sum of two sinusoidal waves. However, according to another embodiment, the transmission signal may be generated by a sum of three or more sinusoidal waves. Accordingly, the transmitting apparatus for simultaneously transmitting wireless information and power of the disclosure may include a plurality of signal generating units and a plurality of phase/amplitude setting units.

At least one of the signal detecting unit 430 and power charging unit 440 of FIG. 4 may be implemented as at least one processor. In addition, a transceiver including an IF or RF circuit for processing a signal received through the antenna may be further included. It may be understood that the transceiver includes at least one of the impedance matching unit 410, the first rectifying unit 422, and second rectifying unit 424 of FIG. 4. At least one processor may control the receiving apparatus 220 to perform various operations described blow.

Figure 5:
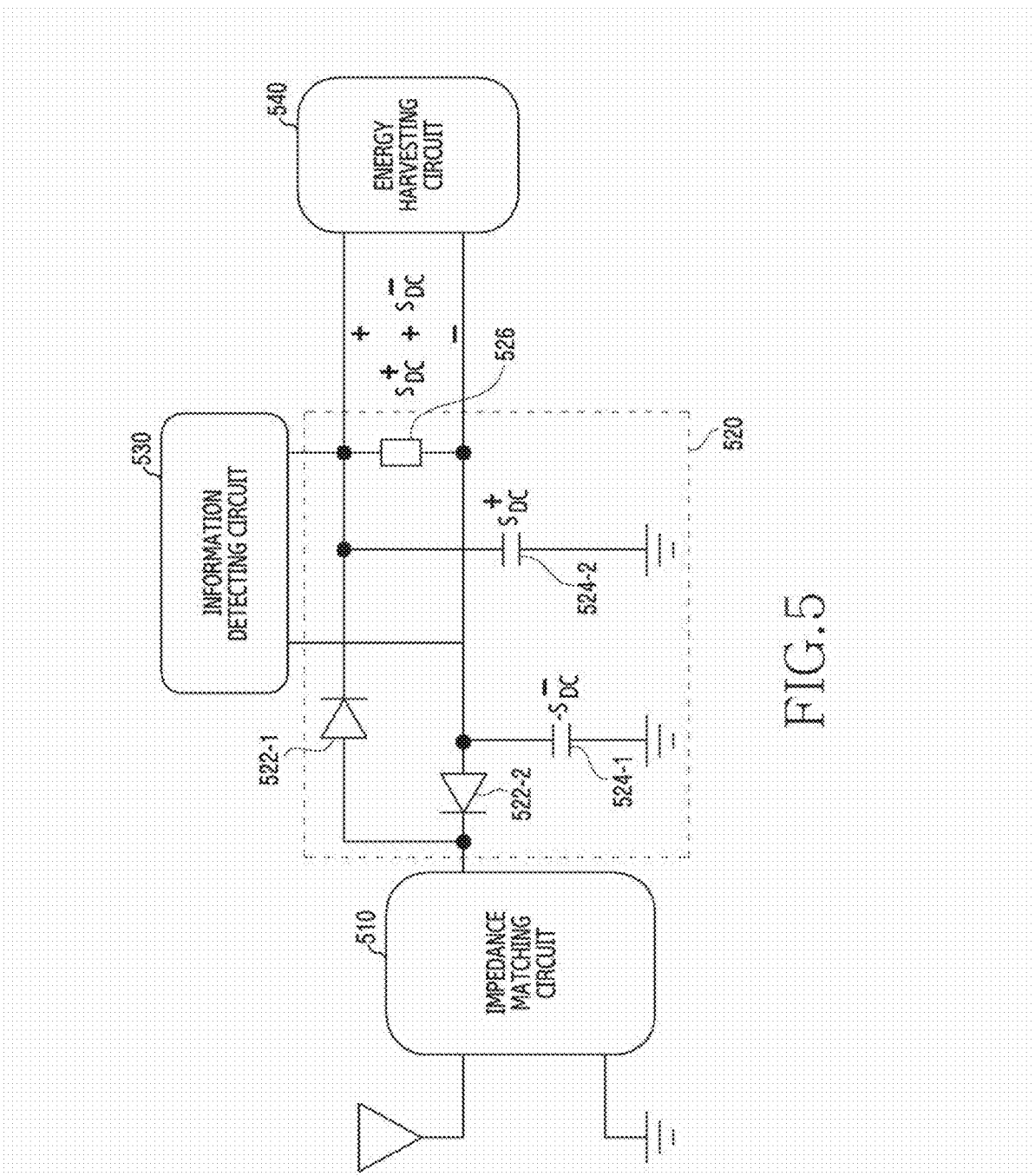
FIG. 5 is an example of a circuit diagram of a receiving device for simultaneously transmitting wireless information and power according to an embodiment of the disclosure.

FIG. 5 is an example of a circuit diagram of a receiving device for simultaneously transmitting wireless information and power according to an embodiment of the disclosure. An example of an implementation of the receiving apparatus 220 of FIG. 4 is illustrated in FIG. 5 as an equivalent circuit.

Referring to FIG. 5, the receiving apparatus includes an impedance matching circuit 510, a rectifying circuit 520, an information detecting circuit 530, and an energy harvesting circuit 540. The impedance matching circuit 510 performs a function of the impedance matching unit 410 of FIG. 4. The information detecting circuit 530 performs a function of the signal detecting unit 430 of FIG. 4. The energy harvesting circuit 540 performs a function of the power charging unit 440 of FIG. 4. The rectifying circuit 520 performs functions of the first rectifying unit 422 and second rectifying unit 424 of FIG. 4.

The rectifying circuit 520 includes a first diode 522-1, a second diode 522-2, a first capacitor 524-1, a second capacitor 524-2, and a load 526. The first diode 522-1 and the first capacitor 524-1 are components for forward rectification, and the second diode 522-2 and the second capacitor 524-2 are components for backward rectification. When a signal having a positive voltage is output from the impedance matching circuit 510, the signal passes through the first diode 522-1, electric charge is charged in the second capacitor 524-2, and a voltage of $s^-_{dc}$ is applied to an upper end of the load 526. When a signal having a negative voltage is output from the impedance matching circuit 510, the signal passes through the second diode 522-2, an electric charge is charged in the first capacitor 524-1, and a voltage of $s^-_{dc}$ is applied to a lower end of the load 526. Accordingly, an electric potential difference corresponding to a sum of $s^+_{dc}$, and $s^-_{dc}$ occurs at both ends of the load 526. Consequently, a DC signal having the electric potential difference corresponding to the sum of $s^+_{dc}$, and $s^-_{dc}$ may be provided to the energy harvesting circuit 540.

Figure 6:
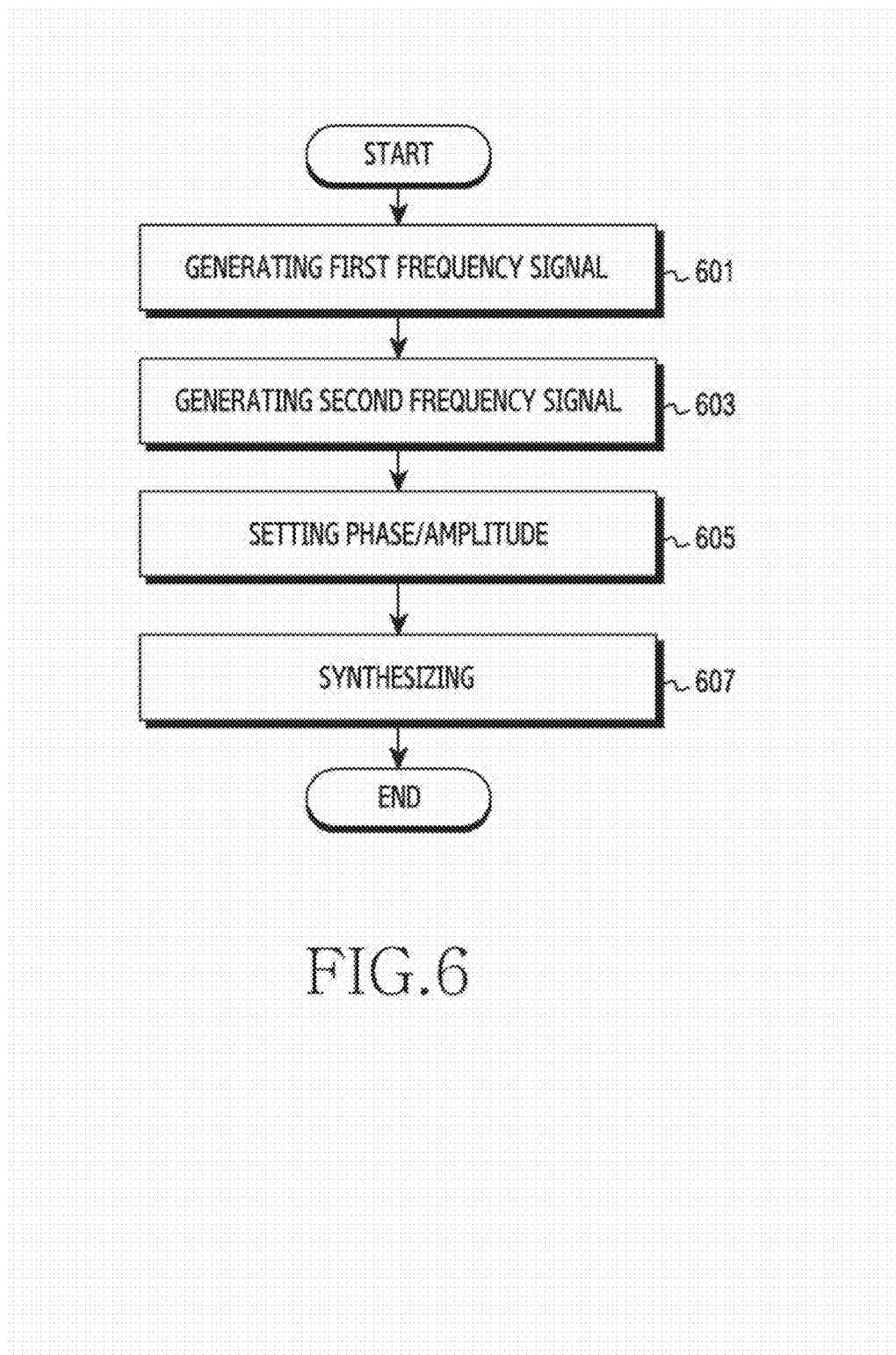
FIG. 6 is a flowchart for wireless information and power transmission of a transmitting apparatus according to an embodiment of the disclosure.

FIG. 6 is a flowchart for wireless information and power transmission of a transmitting apparatus according to an embodiment of the disclosure. A method of operating the transmitting apparatus 210 is exemplified in FIG. 6.

Referring to FIG. 6, a method of simultaneously transmitting wireless information and power according to various embodiments of the disclosure may include a first frequency signal generating operation 601, a second frequency signal generating operation 603, a phase/amplitude setting operation 605, and a synthesizing operation 607.

The first frequency signal generating operation 601 is an operation of generating a first frequency signal in the first frequency signal generating unit 312. The second frequency signal generating operation 603 is an operation of generating a second frequency signal in the second frequency signal generating unit 322. The phase/amplitude setting operation 605 is an operation of setting a phase or amplitude of the first frequency signal and a phase or amplitude of the second frequency signal in the first phase/amplitude setting unit 314 and the second phase/amplitude setting unit 324. The synthesizing operation 607 is an operation of generating a transmission signal by synthesizing the first frequency signal and the second frequency signal.

In FIG. 6, two signals such as the first frequency and the second frequency signal or the like are synthesized. According to other embodiments, a transmission signal may be generated from three or more signals. In this case, in FIG. 6, an operation of generating a frequency signal may be further added.

In summary, a transmitting apparatus generates a symbol including a first set of signals for transferring power and a first information value and a second set of signals for transferring power and a second information value. In addition, the transmitting apparatus transmits the generated symbol. First information and second information are indicated by a result value determined according to a predefined rule on the basis of a maximum value and minimum value of the symbol. In addition, each of the maximum value and the minimum value may be determined based on at least one of frequencies, magnitudes, or phases of the signals included in the symbol.

Figure 7:
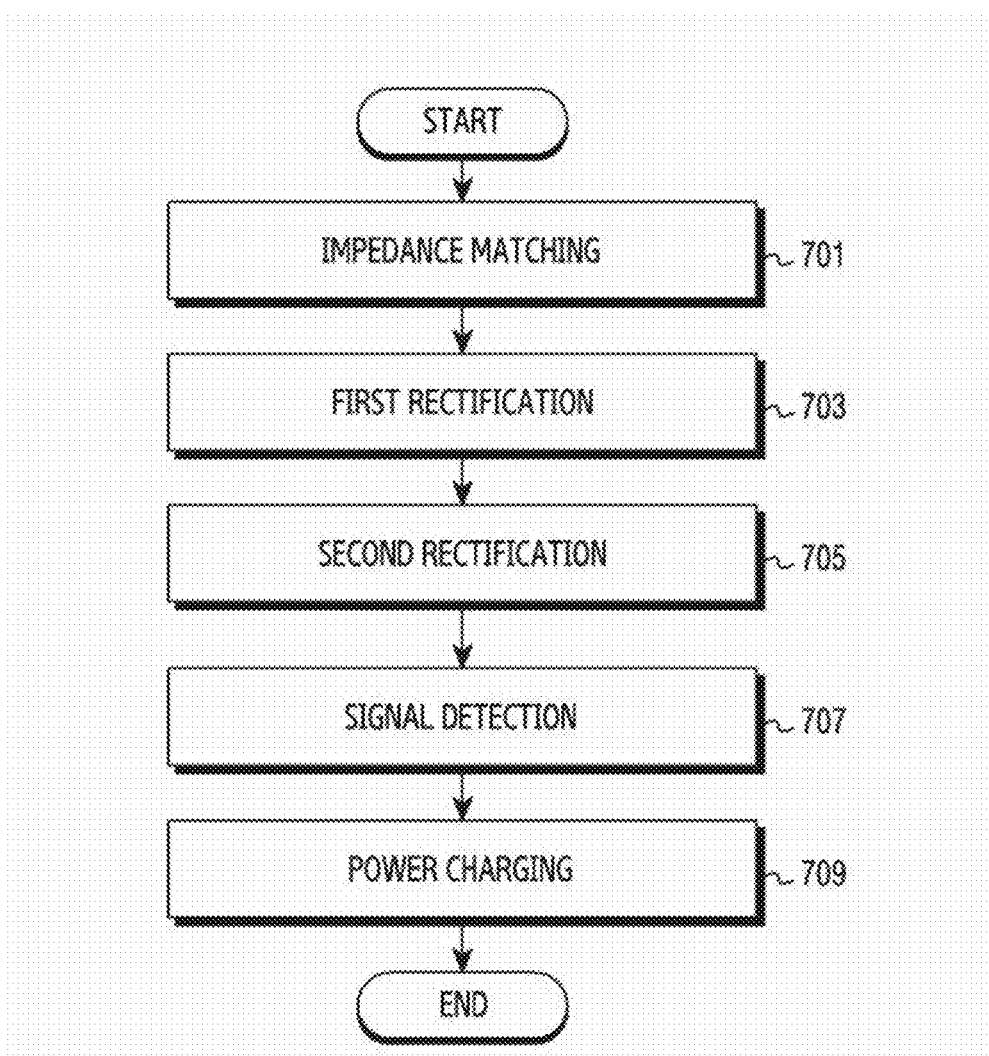
FIG. 7 is a flowchart for wireless information and power reception of a receiving apparatus according to an embodiment of the disclosure.

FIG. 7 is a flowchart for wireless information and power reception of a receiving apparatus according to an embodiment of the disclosure. A method of operating the receiving apparatus 220 is exemplified in FIG. 7.

Referring to FIG. 7, a method of simultaneously receiving wireless information and power according to various embodiments of the disclosure may include an impedance matching operation 701, a first rectifying operation 703, a second rectifying operation 705, a signal detecting operation 707, and a power charging operation 709.

The impedance matching operation 701 is an operation of performing impedance matching in the impedance matching unit 410. The first rectifying operation 703 is an operation of generating a first rectified signal by forwardly rectifying a reception signal in the first rectifying unit 422. The second rectifying operation 705 is an operation of generating a second rectified signal by backwardly rectifying the reception signal in the second rectifying unit 424. The signal detecting operation 707 is an operation of determining an information value of the reception signal by using a magnitude ratio of the first rectified signal and the second rectified signal in the signal detecting unit 430. The power charging operation 709 is an operation of charging power by using an electric potential difference of the first rectified signal and the second rectified signal in the power charging unit 440.

In summary, a receiving apparatus receives a symbol including a first set of signals for transmitting power and a first information value and a second set of signals for transmitting power and a second information value. The receiving apparatus detects first information and second information from the symbol, and harvests power from the symbol. The first information and the second information are indicated by a result value determined according to a predefined rule on the basis of a maximum value and minimum value of the symbol. In addition, each of the maximum value and the minimum value may be determined based on at least one of frequencies, magnitudes, or phases of the signals included in the symbol.

As described above, a transmission signal may be generated by synthesizing a plurality of sinusoidal waves. Information may be detected based on magnitudes of a first rectified signal acquired by forward rectification and a second rectified signal acquired by backward rectification with respect to the transmission signal. Energy may be harvested by using an electric potential difference of the first rectified signal and the second rectified signal. According to various embodiments, a rule or function for detecting information and a structure of the transmission signal may be defined variously according to various embodiments. Hereinafter, the disclosure describes various embodiments for transmission signal design and information detection.

Figure 8A:
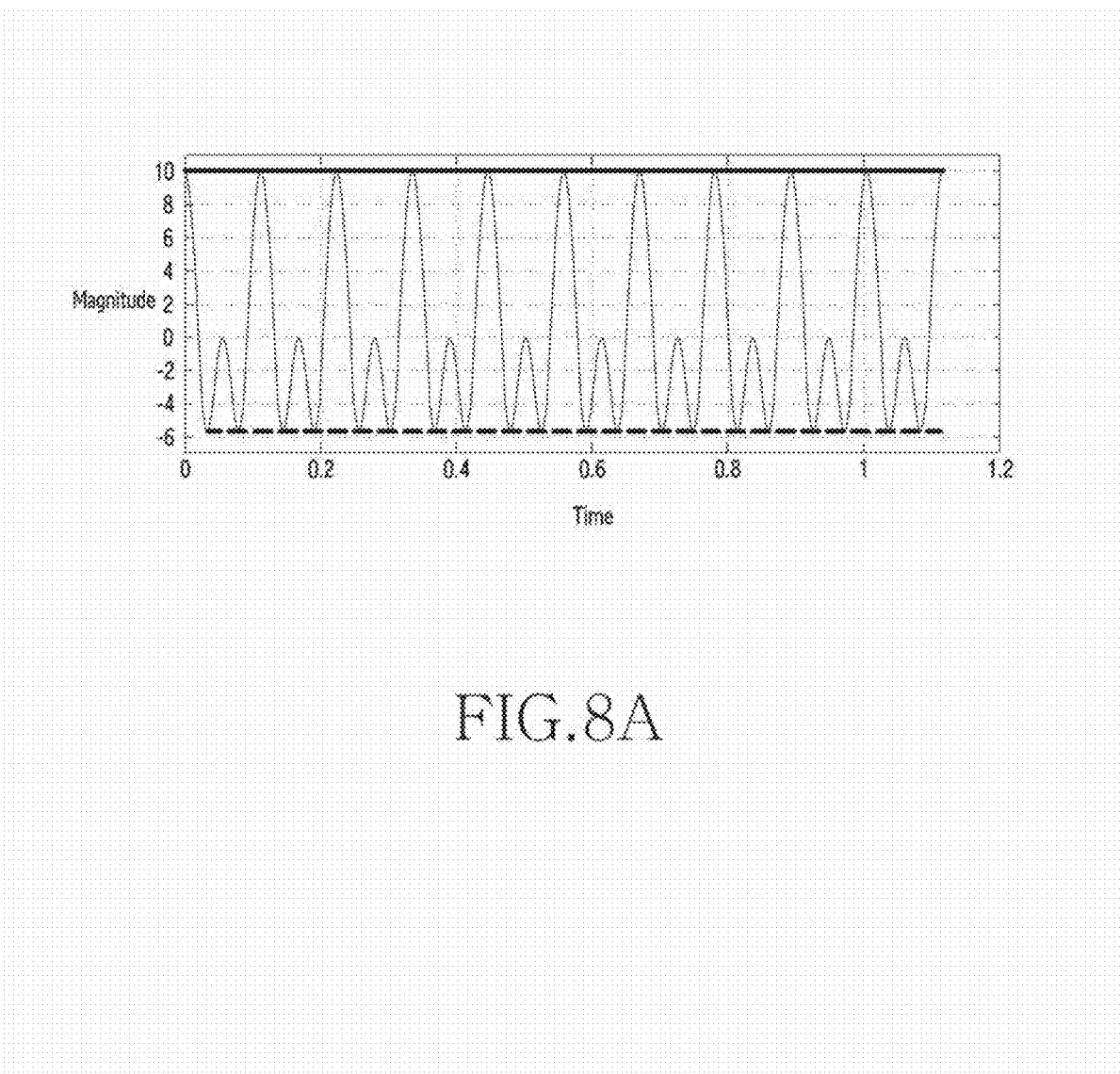
FIGS. 8A and 8B illustrate transmission signals according to an embodiment of the disclosure.
Figure 8B:
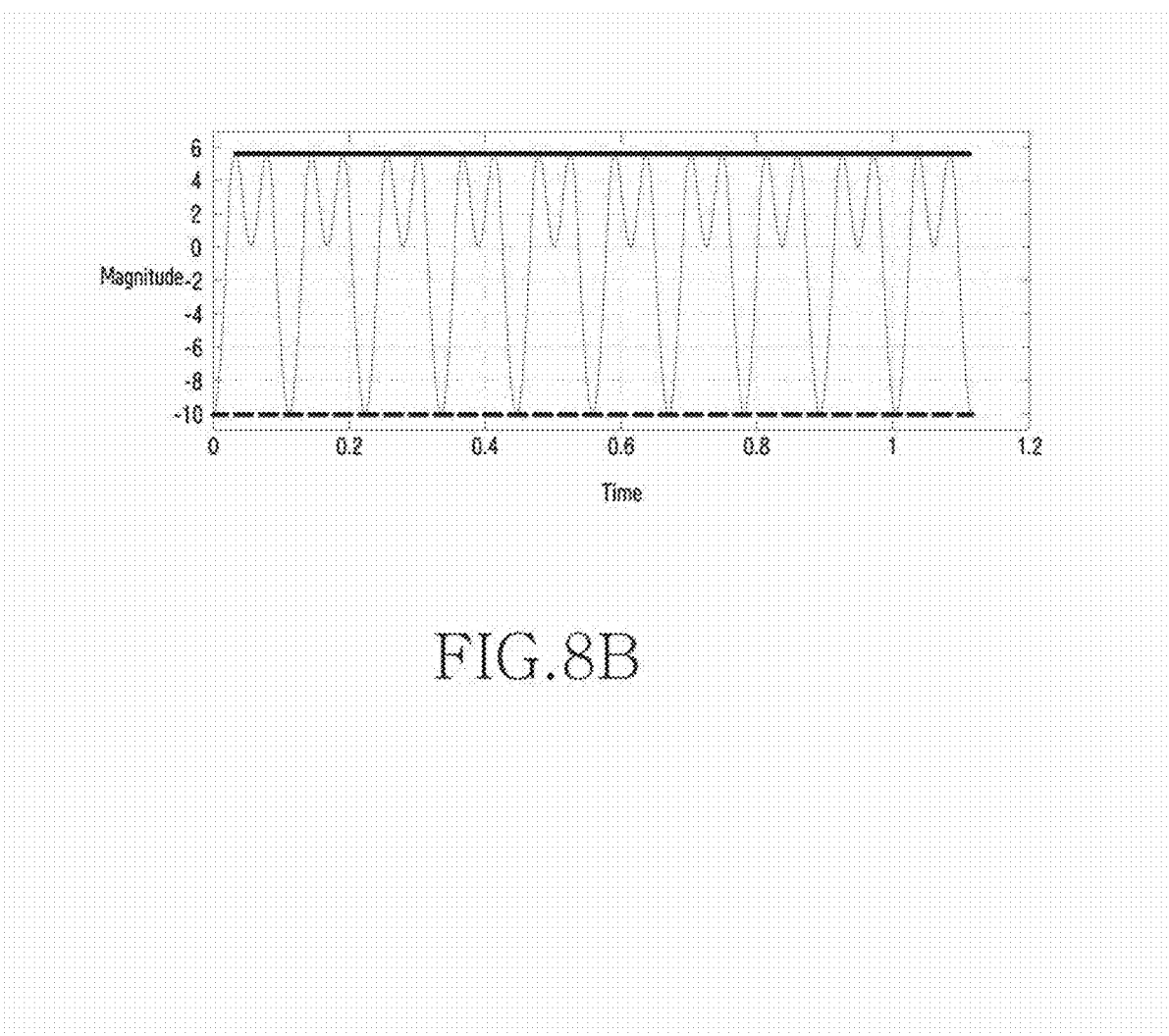

FIGS. 8A and 8B illustrate transmission signals according to a first embodiment of the disclosure.

Referring to FIGS. 8A and 8B, a transmission signal is defined as a synthesis of two sinusoidal waves, and information is expressed by a magnitude ratio of rectified signals. A transmission signal indicating an information value of 1 is exemplified in FIG. 8A, and a transmission signal indicating an information value of 0 is exemplified in FIG. 8B.

A case where maximum average power that can be output during a period T is 25 and a transmission signal is generated by synthesizing two sinusoidal waves is assumed in the example of FIGS. 8A and 8B. In this case, the transmission signal may be defined by Equation 5 below.

$$s(t) = A_1 \cos(2\pi f_1 t + \theta_1) + A_2 \cos(2\pi f_2 t + \theta_2) \quad \text{Equation 5}$$

In Equation 5, s(t) denotes a transmission signal, $A_k$ denotes a magnitude of a k-th sinusoidal wave, $f_k$ denotes a frequency of the k-th sinusoidal wave, and $\theta_k$ denotes a phase of the k-the sinusoidal wave.

Referring to Equation 5, desired information may be delivered by adjusting $A_1$, $A_2$, $f_1$, $f_2$, $\theta_1$, and $\theta_2$. In this case, $A_1$ and $A_2$ are selected to satisfy $A_1^2 + A_2^2 = 50$ according to a maximum power condition, for example, the condition of Equation 2. According to an embodiment, when an information value of 1 or 0 is transmitted, an example of mapping an information value and a combination of a magnitude, frequency, and phase of each signal is as shown in Table 1 below.

TABLE 1

| Information value | First frequency signal | Second frequency signal |
|---|---|---|
| 1 | $A_1 = 5$, $f_1 = 900$ MHz, $\theta_1 = 0$ | $A_2 = 5$, $f_2 = 1800$ MHz, $\theta_2 = 0$ |
| 0 | $A_1 = 5$, $f_1 = 900$ MHz, $\theta_1 = \pi$ | $A_2 = 5$, $f_2 = 1800$ MHz, $\theta_2 = \pi$ |

When conforming to a mapping rule of Table 1, a first symbol indicating the information value of 1 is as shown in FIG. 8A. In FIG. 8A, a forwardly rectified signal is indicated by a bold solid line, and a backwardly rectified signal is indicated by a bold dotted line. A second symbol indicating the information value of 0 is as shown in FIG. 8B. In FIG. 8B, a forwardly rectified signal is indicated by a bold solid line, and a backwardly rectified signal is indicated by a bold dotted line.

In all cases of transmitting the information values of 1 and 0, constant power may be transferred since a transmission signal has power of 25. There is no problem in that a signal of lower power is transmitted according to the information value. In addition, if the number of information values is greater than or equal to 3, a combination of a magnitude (e.g., $s^+_{dc}$) of the forwardly rectified signal and a magnitude (e.g., $s^-_{dc}$) of the backwardly rectified signal is defined differently accordingly to the information value while maintaining maximum transmissible power $P_T$.

In addition, referring to FIGS. 8A and 8B, a magnitude ratio of a maximum value and minimum value of a transmission signal is 10:5.625 in case of transmitting the information value of 1, and the magnitude ratio of the maximum value and minimum value of the transmission signal is 5.625:10 in case of transmitting the information value of 0, and thus it can be seen that the magnitude ratios are different in the two cases. In case of receiving a signal of FIG. 8A, since a magnitude ratio of the first rectified signal and the second rectified signal is 10:5.625, the receiving apparatus 200 may determine that 1 is received as the information value. In case of receiving a signal of FIG. 8B, since a magnitude ratio of the first rectified signal and the second rectified signal is 5.625:10, the receiving apparatus 200 may determine that 0 is received as the information value. In addition, referring to FIGS. 8A and 8B, since power is charged by using an electric potential difference of the first rectified signal and the second rectified signal, power may be charged from a DC signal having an amplitude of 15.625 in both a case of receiving the information value of 1 and a case of receiving the information value of 0.

According to another embodiment, a case where four symbols are defined, (i.e., four information values can be delivered), is as follows under the condition that maximum transmissible power is $P_T$, a frequency $f_1$ of a first frequency signal is 900 MHz, and a frequency $f_2$ of a second frequency signal is 1800 MHz.

A transmission signal is defined by a sum of two frequency signals, and may be expressed as shown in Equation 5. $A_1$ and $A_2$ which satisfy $(A_1^2+A_2^2)/2=P_T$ are selected such that power of the transmission signal s(t) is $P_T$. For example, $A_1$ and $A_2$ may be selected as shown in Equation 6 below.

$$A_1 = \sqrt{2\alpha P_T}$$
$$A_2 = \sqrt{2(1-\alpha)P_T} \quad \text{Equation 6}$$
$$\alpha \in [0, 1]$$

In Equation 6, $A_k$ denotes a magnitude of a k-th sinusoidal wave, a denotes a power distribution weight, and $P_T$ denotes power of a transmission signal.

According to Equation 6, how to distribute power $P_T$ to a first frequency signal and a second frequency signal is determined based on a value of the power distribution weight $\alpha$. An information value to be delivered may be mapped to a value of $f(s^+_{dc}, s^-_{dc})=s^+_{dc}/s^-_{dc}$.

To generate four symbols, variables regarding the first frequency signal and the second frequency signal may be defined variously. The four symbols may be defined by fixing $\alpha$ to 0.8 and $\theta_1$ to 0 and by adjusting $\theta_2$. When $\theta_2$ is adjusted within a range of 0 to $2\pi$, a value of $f(s^+_{dc}, s^-_{dc})$ may change as shown in Equation 7 below.

$$f(s^+_{dc}, s^-_{dc}) = \frac{s^+_{dc}}{s^-_{dc}} = \frac{|\max_{t\in[0,T)}\{s(t)\}|}{|\min_{t\in[0,T)}\{s(t)\}|} \quad \text{Equation 7}$$

In Equation 7, $f(s^+_{dc}, s^-_{dc})$ denotes an information detecting function, s(t) denotes a transmission signal, $s^+_{dc}$ denotes a magnitude of a signal acquired by forwardly rectifying the transmission signal, $s^-_{dc}$ denotes a magnitude of a signal acquired by backwardly rectifying the transmission signal, and T denotes a symbol period.

Figure 9:
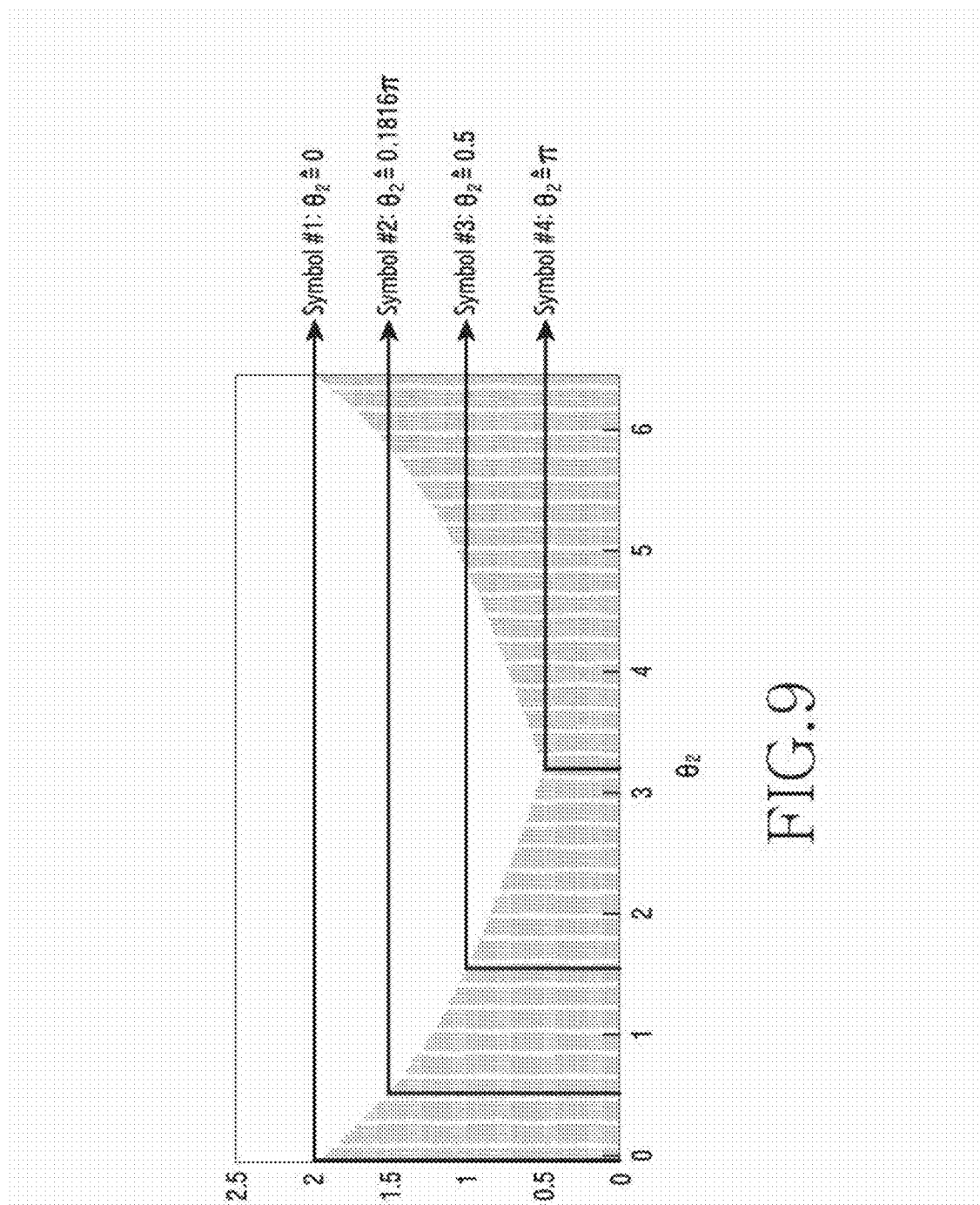
FIG. 9 illustrates a change in a function result value which expresses information based on frequency signals included in transmission signals according to an embodiment of the disclosure.

FIG. 9 illustrates a change in a result value of an information detecting function (hereinafter, referred to as a 'function value result' or a 'result value) based on frequency signals included in transmission signals according to another embodiment of the disclosure. A change in a result value of $f(s^+_{dc}, s^-_{dc})$ based on a value $\theta_2$ is illustrated in FIG. 9.

Referring to FIG. 9, the result value of $f(s^+_{dc}, s^{-dc})$ changes within a range of 0.5 to 2 along with a change in $\theta_2$. In this case, the result value of $f(s^+_{dc}, s^-_{dc})$ corresponding to first, second, third, and fourth symbols indicating information values 0, 1, 2, and 3 may be selected as 2, 1.5, 1, and 0, 5. In this case, the values $\theta_2$ are 0, 0.1816$\pi$, 0.57$\pi$, and $\pi$. An example of mapping an information value and a combination of a magnitude, frequency, and phase of each signal for information values is as shown in Table 2 below.

TABLE 2

| Information value | First frequency signal | Second frequency signal |
|---|---|---|
| 1 | $A_1 = \sqrt{1.6P_T}$, $f_1 = 900$ MHz, $\theta_1 = 0$, | $A_2 = \sqrt{0.4P_T}$, $f_2 = 1800$ MHz, $\theta_2 = 0$ |
| 0 | $A_1 = \sqrt{1.6P_T}$, $f_1 = 900$ MHz, $\theta_1 = 0$, | $A_2 = \sqrt{0.4P_T}$, $f_2 = 1800$ MHz, $\theta_2 = 0.1816\pi$ |
| 2 | $A_1 = \sqrt{1.6P_T}$, $f_1 = 900$ MHz, $\theta_1 = 0$, | $A_2 = \sqrt{0.4P_T}$, $f_2 = 1800$ MHz, $\theta_2 = 0.5\pi$ |
| 3 | $A_1 = \sqrt{1.6P_T}$, $f_1 = 900$ MHz, $\theta_1 = 0$, | $A_2 = \sqrt{0.4P_T}$, $f_2 = 1800$ MHz, $\theta_2 = \pi$ |

According to another embodiment, a case where N symbols are defined, (i.e., N information values can be delivered), is as follows under the condition that maximum transmissible power is $P_T$, a frequency $f_1$ of a first frequency signal is 900 MHz, a frequency $f_2$ of a second frequency signal is 1800 MHz, and phases of the first frequency signal and the second frequency signal are both 0.

A transmission signal is defined by a sum of two frequency signals, and may be expressed as shown in Equation 5. $A_1$ and $A_2$ which satisfy $(A_1^2+A_2^2)/2=P_T$ are selected such that power of the transmission signal s(t) is $P_T$. For example, $A_1$ and $A_2$ may be selected as shown in Equation 6. Since a phase $\theta_1$ of the first frequency signal and a phase $\theta_2$ of the second frequency signal are both 0, a symbol is determined by $\alpha$. Considering a case where an information value to be delivered is mapped to $f(s^+_{dc}, s^-_{dc})=s^+_{dc}/s^-_{dc}$, a value of $f(s^+_{dc}, s^-_{dc})$ may be expressed as shown in Equation 7.

Figure 10:
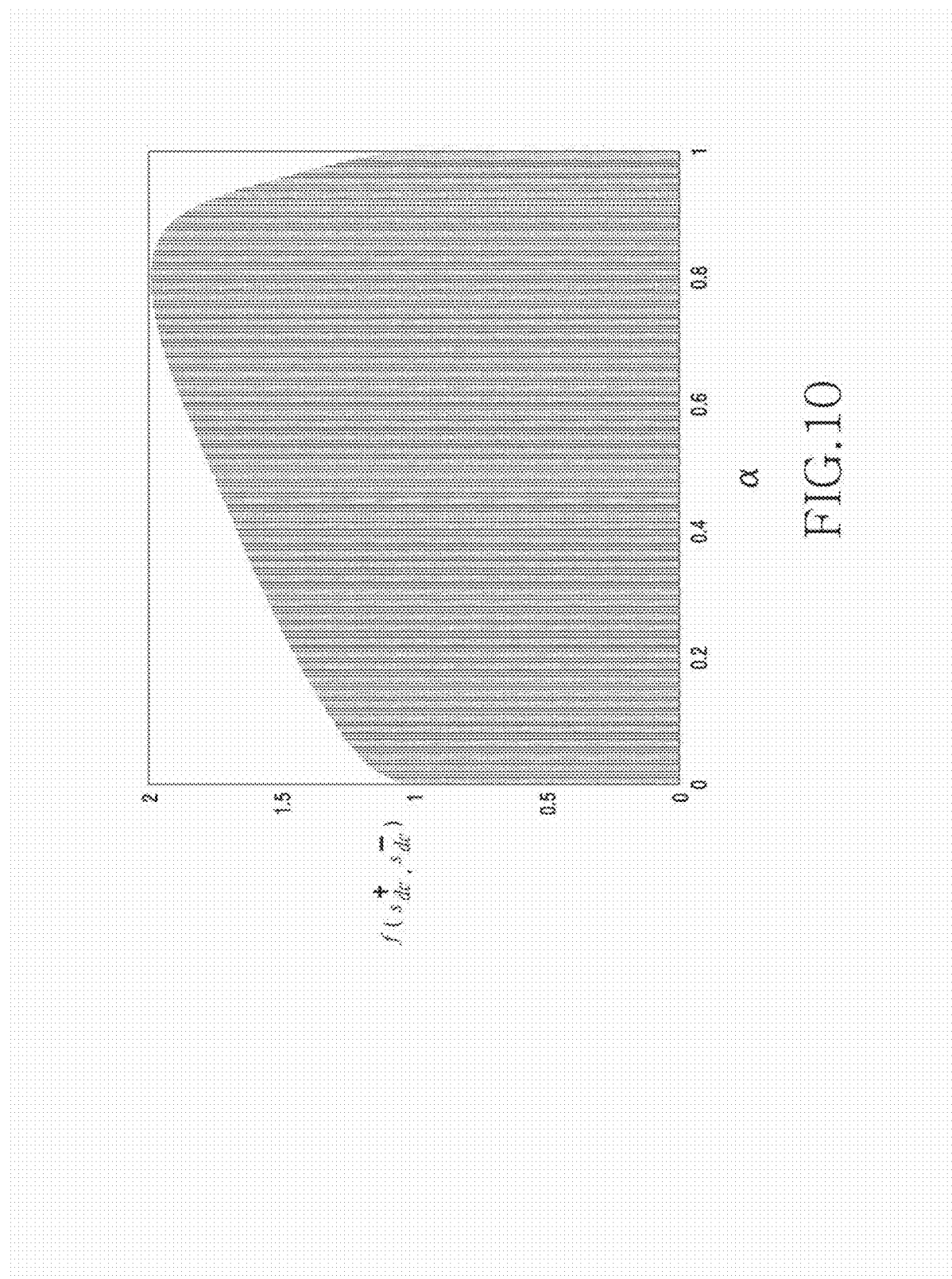
FIG. 10 illustrates a change in a function result value which expresses information based on a magnitude of a frequency signal included in transmission signals according to an embodiment of the disclosure.

FIG. 10 illustrates a change in a function result value which expresses information based on a magnitude of a frequency signal included in transmission signals according to another embodiment of the disclosure. A change in $f(s^+_{dc}, s^{-dc})$ based on a value $\alpha$ which varies in a range of 0 to 1 is illustrated in FIG. 10.

Referring to FIG. 10, the value of $f(s^+_{dc}, s^-_{dc})$ may have a value in a range of 1 to 2 according to the value $\alpha$. Therefore, mapping between the symbol and the value $\alpha$ may be defined to have different values of $f(s^+_{dc}, s^-_{dc})$ according to the information value to be delivered.

When a phase is fixed to 0, for $x\in[1,2]$, the value $\alpha$ satisfying $f(s^+_{dc}, s^-_{dc})=x$ may be acquired by a closed formula. For example, if the value $\alpha$ is defined as shown in Equation 8 below under the condition that a transmission signal is defined as shown in Equation 5, $f_2=2f_1$ is satisfied, and $A_1$ and $A_2$ are given as shown in Equation 6, then the value of $f(s^+_{dc}, s^-_{dc})$ changes in a range of [1,2].

$$\alpha = 8 \cdot \frac{c_2 - \sqrt{c_2^2 - c_1 c_3}}{c_1} \quad \text{Equation 8}$$
$$c_1 = 49x^2 - 112x + 128$$
$$c_2 = 7x^2 - 15x + 12, \quad c_3 = (x-1)^2$$

In Equation 8, $\alpha$ denotes a power distribution weight, and x denotes a result value of an information detecting function.

If the number of information values (i.e., the number of symbols), to be used in a system is N, when an i-th symbol is to be generated, the transmitting apparatus may generate the transmission signal s(t) by using the value $\alpha$ determined according to Equation 9 below.

$$x = 1 + \frac{i-1}{N-1} \quad \text{Equation 9}$$

In Equation 9, x denotes a result value of an information detecting function, N denotes the number of candidate transmission symbols, and i denotes an index of the transmission symbol.

For example, if N is 2, an example of mapping a value $\alpha$ for information values is as shown in Table 3 below.

TABLE 3

| Information value | α | s(t) |
|---|---|---|
| 0 | 1 | $\sqrt{2P_T}\cos(2\pi f_1 t)$ |
| 1 | 0.8 | $\sqrt{1.6P_T}\cos(2\pi f_1 t) + \sqrt{0.4P_T}\cos(2\pi f_2 t)$ |

When symbols are defined as shown in Table 3, since an information value is expressed by a magnitude ratio of signals to be synthesized, a corresponding modulation scheme may be referred to as amplitude ratio shift keying (ARSK).

Figure 11A:
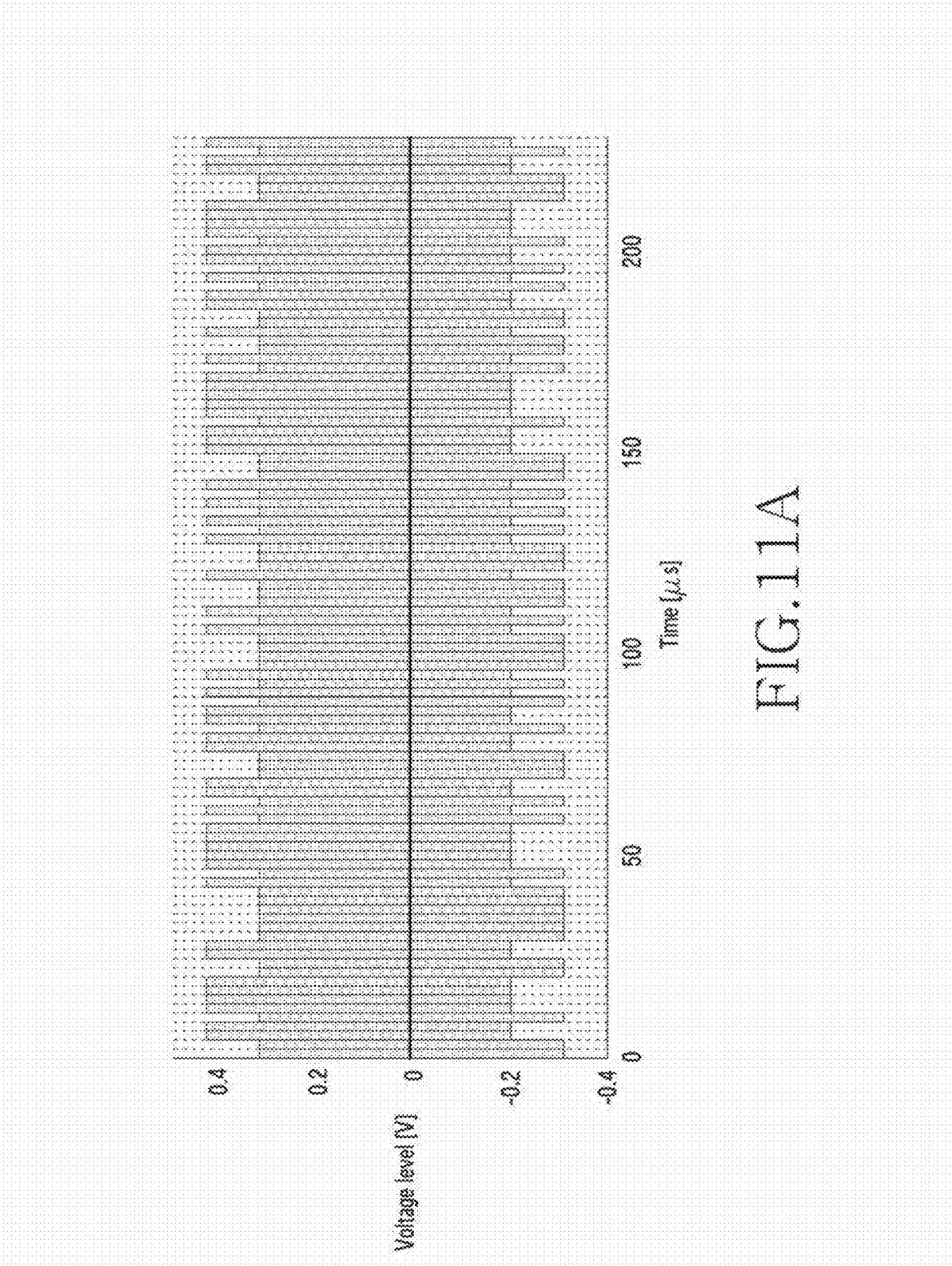
FIGS. 11A and 11B illustrate an example of transmission symbols based on a modulation scheme and transmission symbols based on amplitude shift keying (ASK) according to an embodiment of the disclosure.
Figure 11B:
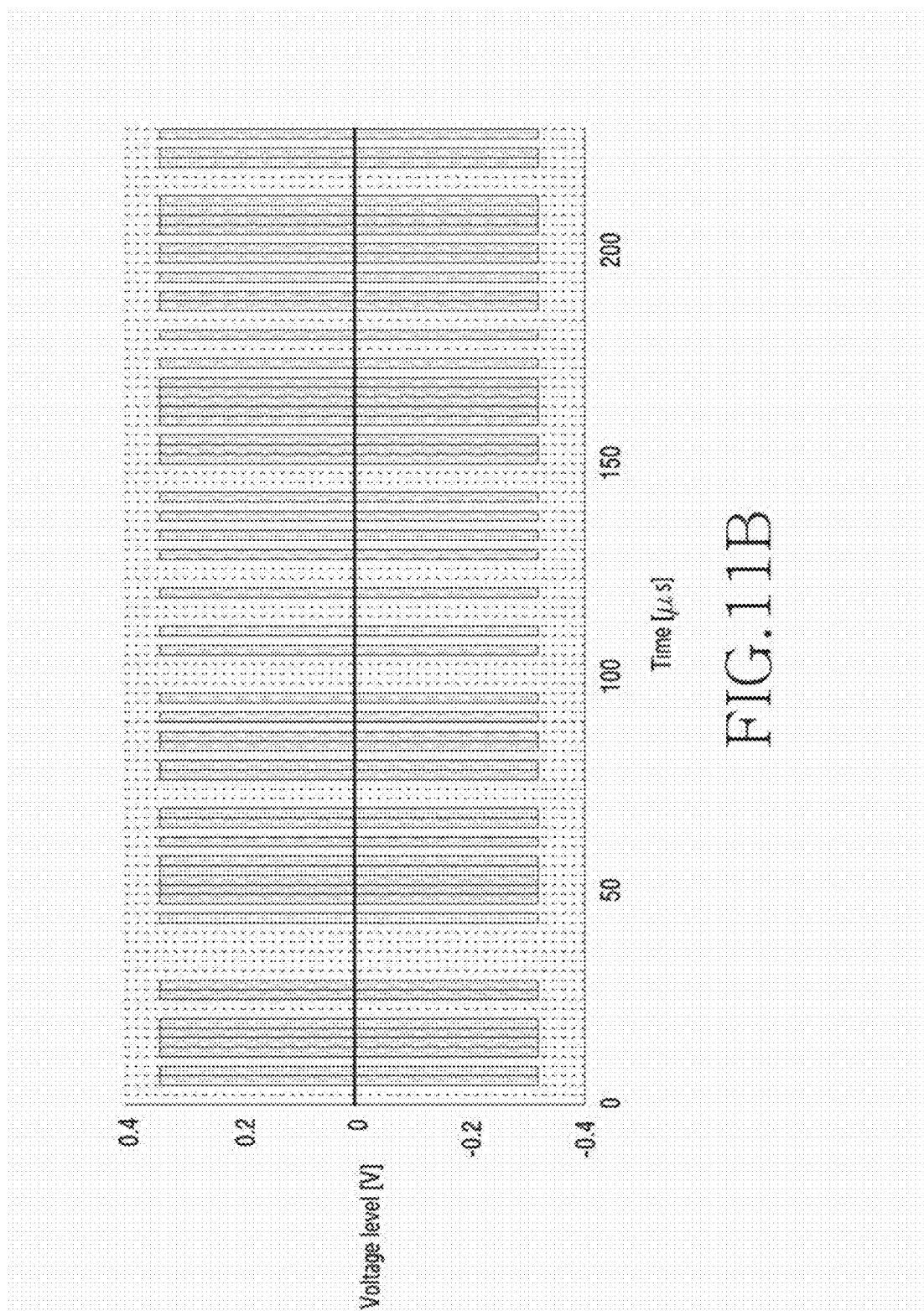
Figure 12A:
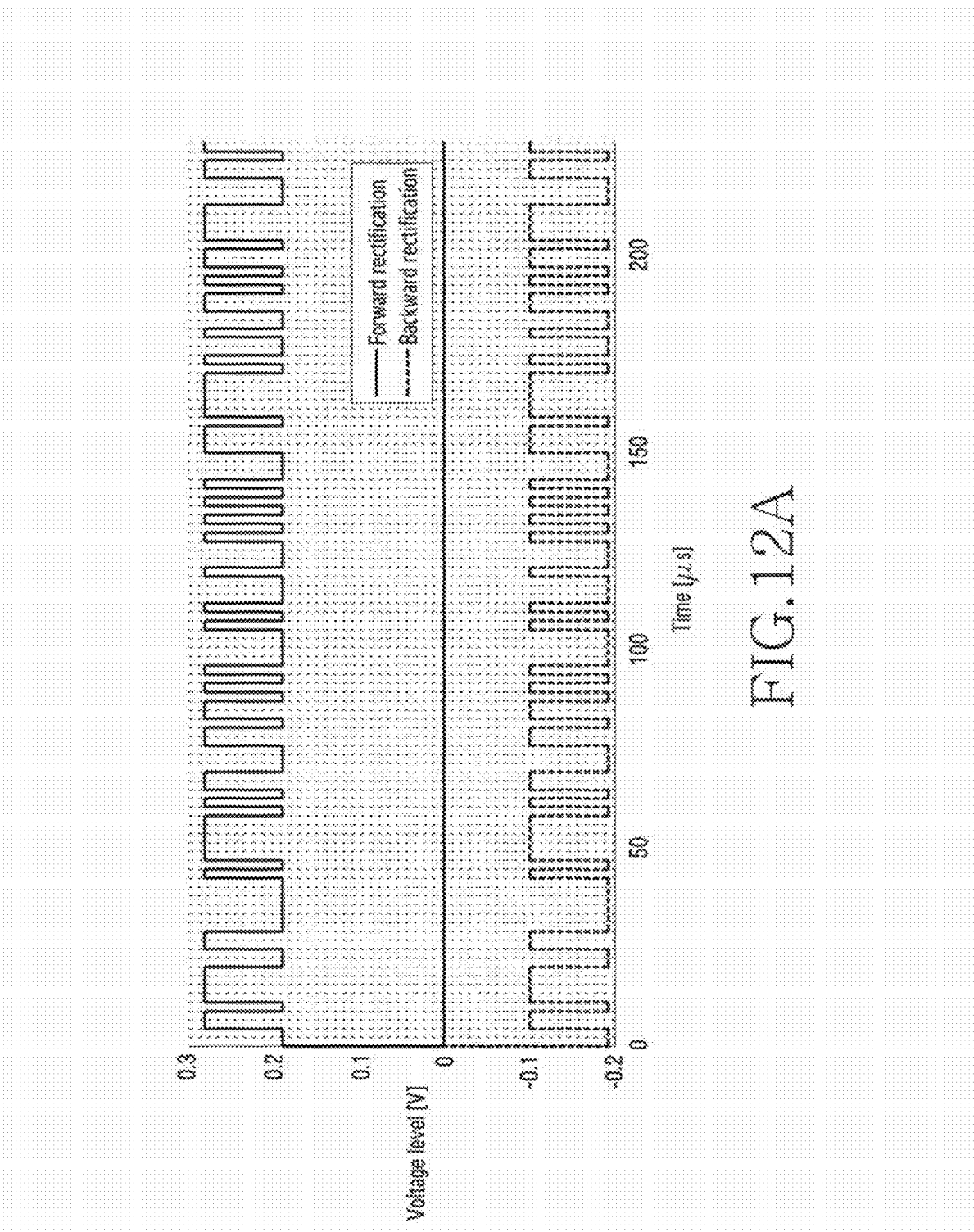
FIGS. 12A and 12B illustrate an example of a rectification result for transmission symbols based on a modulation scheme and a rectification result for transmission symbols based on ASK according to an embodiment of the disclosure.
Figure 13B:
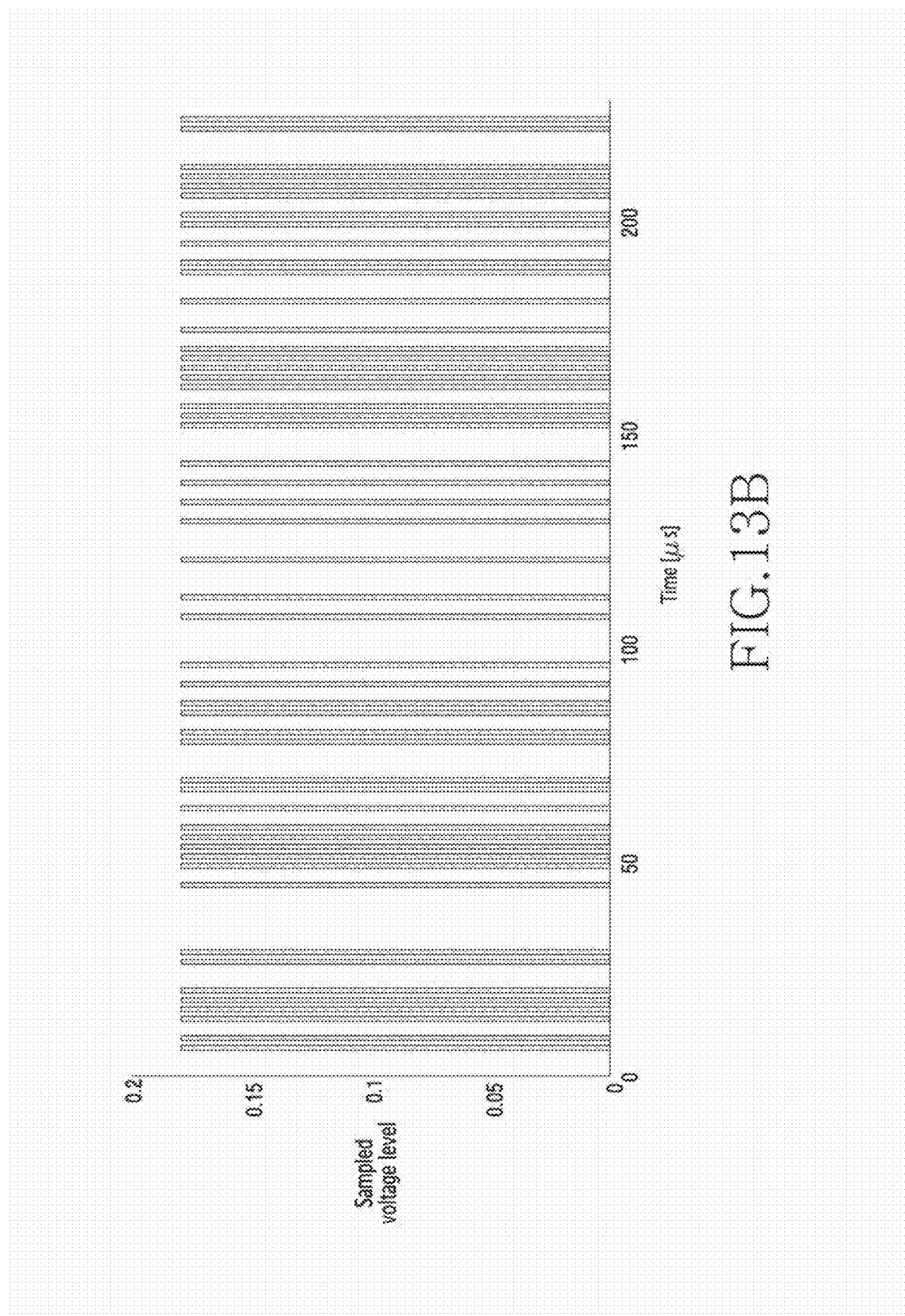
Figure 14B:
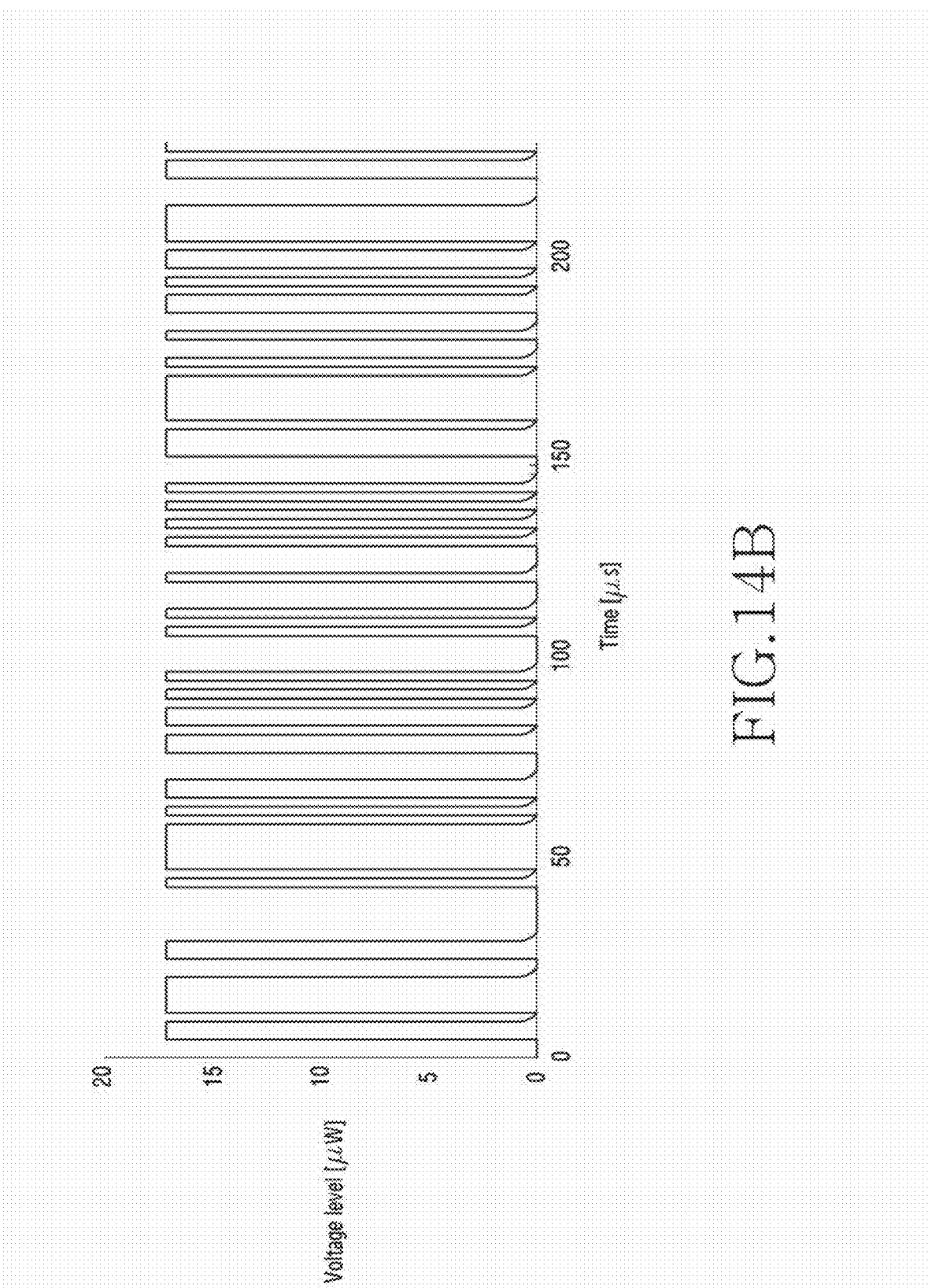

Hereinafter, the disclosure describes a modulation scheme according to an embodiment by comparing a case of conforming to a mapping rule of Table 3 and a case of conforming to typical amplitude shift keying (ASK). FIGS. 11A and 11B illustrate a waveform of a transmission signal, FIG. 12A and FIG. 11B illustrate rectified signals, FIG. 13A and FIG. 13B illustrate function result values which indicate information, and FIG. 14A and FIG. 14B illustrate power which can be used in energy harvesting.

FIGS. 11A and 11B illustrate an example of transmission symbols based on a modulation scheme and transmission symbols based on ASK according to an embodiment of the disclosure. A series of transmission symbols based on ARSK are exemplified in FIG. 11A, and a series of transmission symbols based on ASK are exemplified in FIG. 11B.

Referring to FIGS. 11A and 11B, one space of a time axis denotes one symbol period, and information values to be transmitted are 0, 0, 1, 1, 0, 1, 1, 1, 1, etc.

Referring to FIG. 11B, in case of conforming to ASK, if 0 is transmitted, an amplitude of the transmission signal is 0.

Referring to FIG. 11A, in case of conforming to ASK, even if 0 is transmitted, the amplitude of the transmission signal is not 0.

Figure 12B:
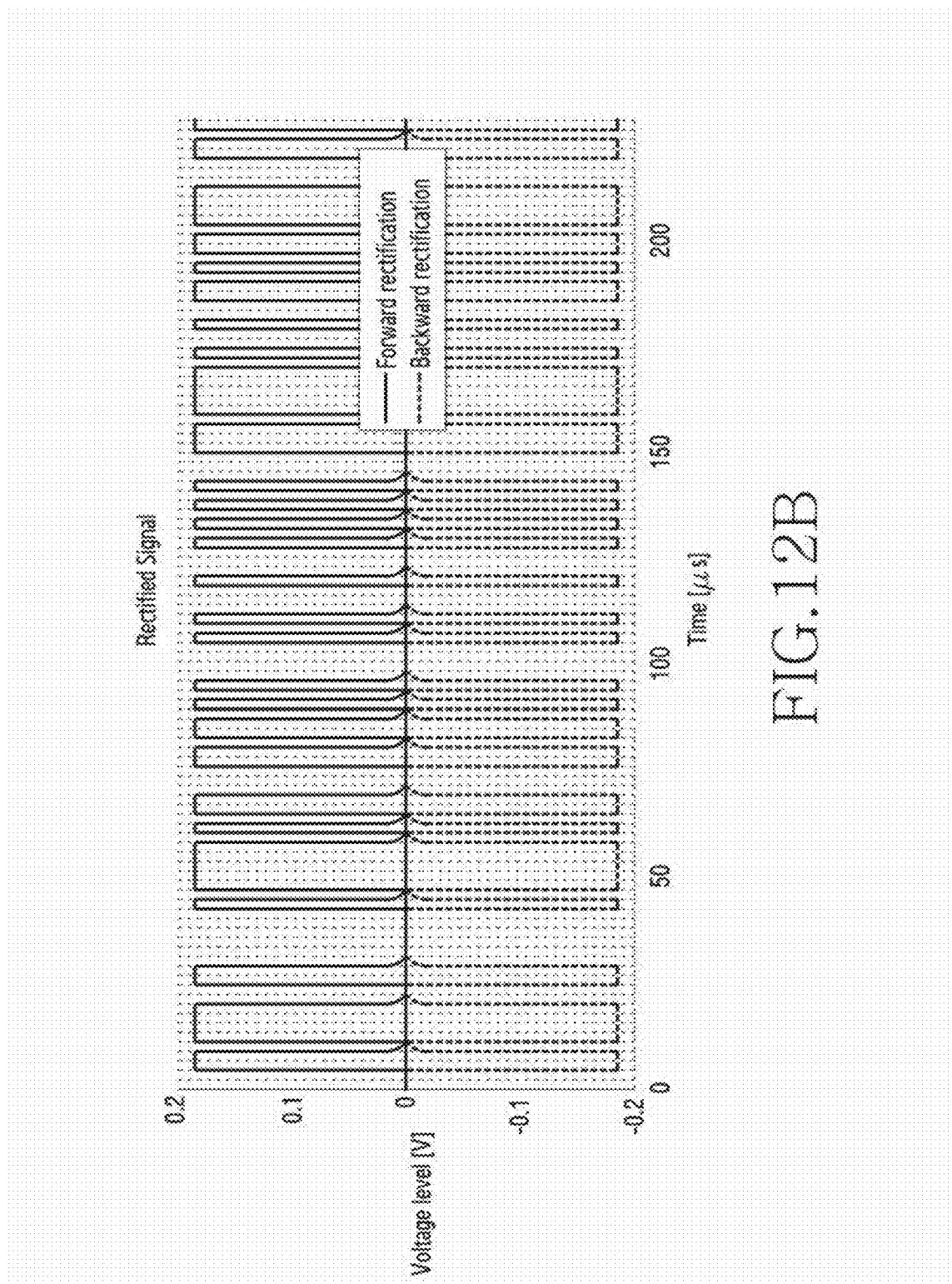

FIGS. 12A and 12B illustrate an example of a rectification result for transmission symbols based on a modulation scheme and a rectification result for transmission symbols based on ASK according to an embodiment of the disclosure.

Referring to FIG. 12B, in case of ASK, if 1 is received, a magnitude of a rectified signal converges almost to 0.

Referring to FIG. 12A, in case of ARSK, an electric potential difference of a specific magnitude or higher occurs irrespective of the information value.

FIGS. 13A and 13B illustrate an example of function result values for a transmission signal based on a modulation scheme and function result values for a transmission signal based on ASK according to an embodiment of the disclosure.

Referring to FIG. 13A, in case of ARSK, a function result value for a symbol indicating an information value of 0 is 1, and a function result value for a symbol indicating an information value of 1 is about 2.7. In case of ASK, a function for information detection is defined as a signal magnitude.

Referring to FIG. 13B, in case of ASK, a function result value for a symbol indicating an information value of 0 is 0, and a function result value for a symbol indicating an information value of 1 is about 0.19. Referring to FIG. 13A and FIG. 13B, a distance between the function result values for information detection is greater in the ARSK than in the ASK.

The function result values of FIG. 13A and FIG. 13B are acquired through a simulation in which not an ideal circuit but an actual diode capacitor, resistor, and the like are considered. Unlike in an ideal situation, $s^+_{dc}$ and $s^-_{dc}$ do not match with a maximum value and minimum value of a transmission signal s(t). A pre-processing method or a post-processing method to address this issue. The pre-processing method is a method of generating the transmission signal s(t) by considering an error in a transmitting apparatus. The post-processing method is a method of processing a portion of the error at a receiving end.

FIGS. 14A and 14B illustrate an example of power that can be used to harvest energy acquired from a transmission signal according to an embodiment of the disclosure and power that can be used to harvest energy acquired from a transmission signal based on ASK.

Referring to FIG. 14B, in case of ASK, a power value changes rapidly in a range of 0 to about 17, depending on information.

Referring to FIG. 14A, in case of ARSK, the power value maintains a value of 17 or higher on average.

Figure 15A:
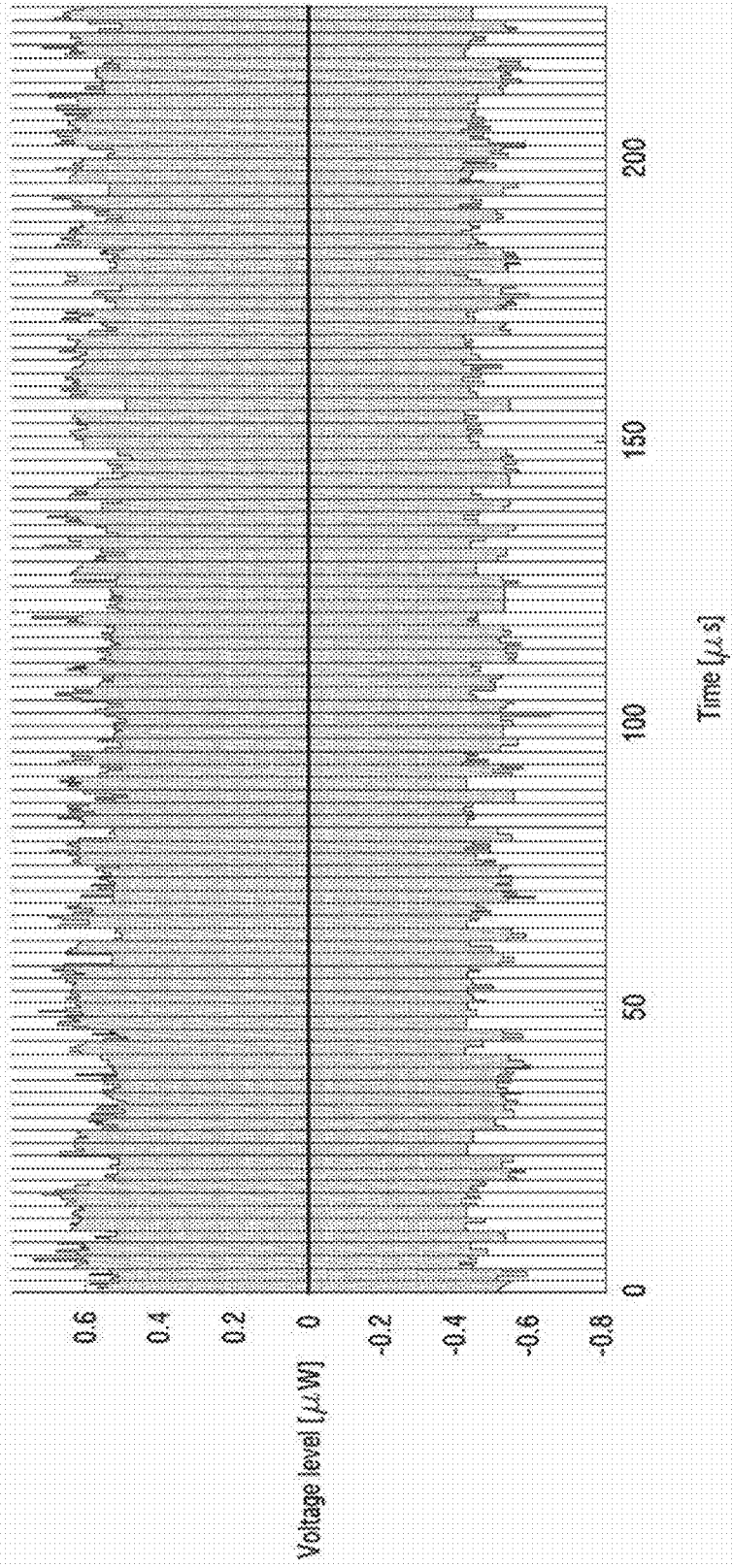
Figure 15B:
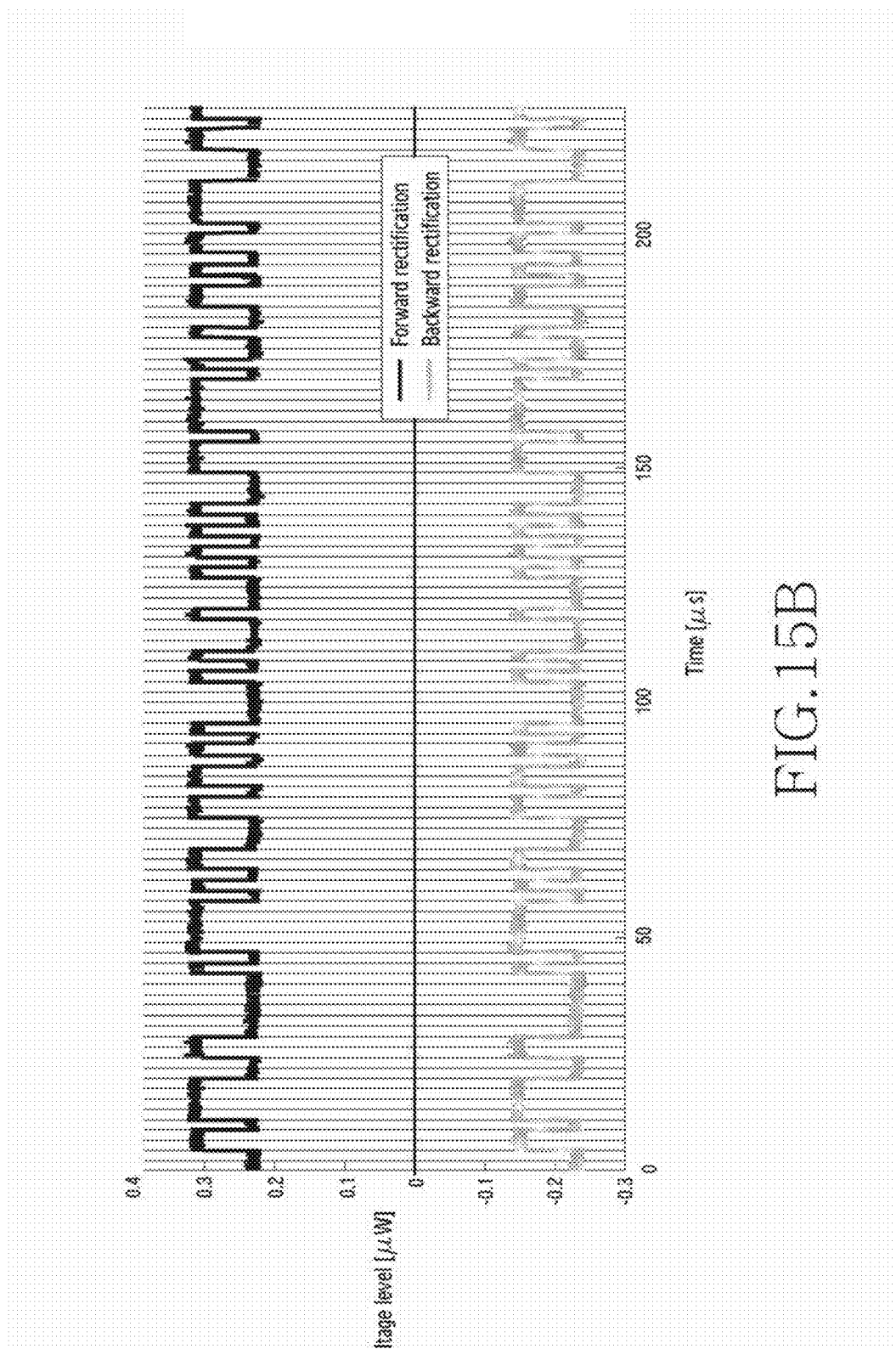
Figure 15C:
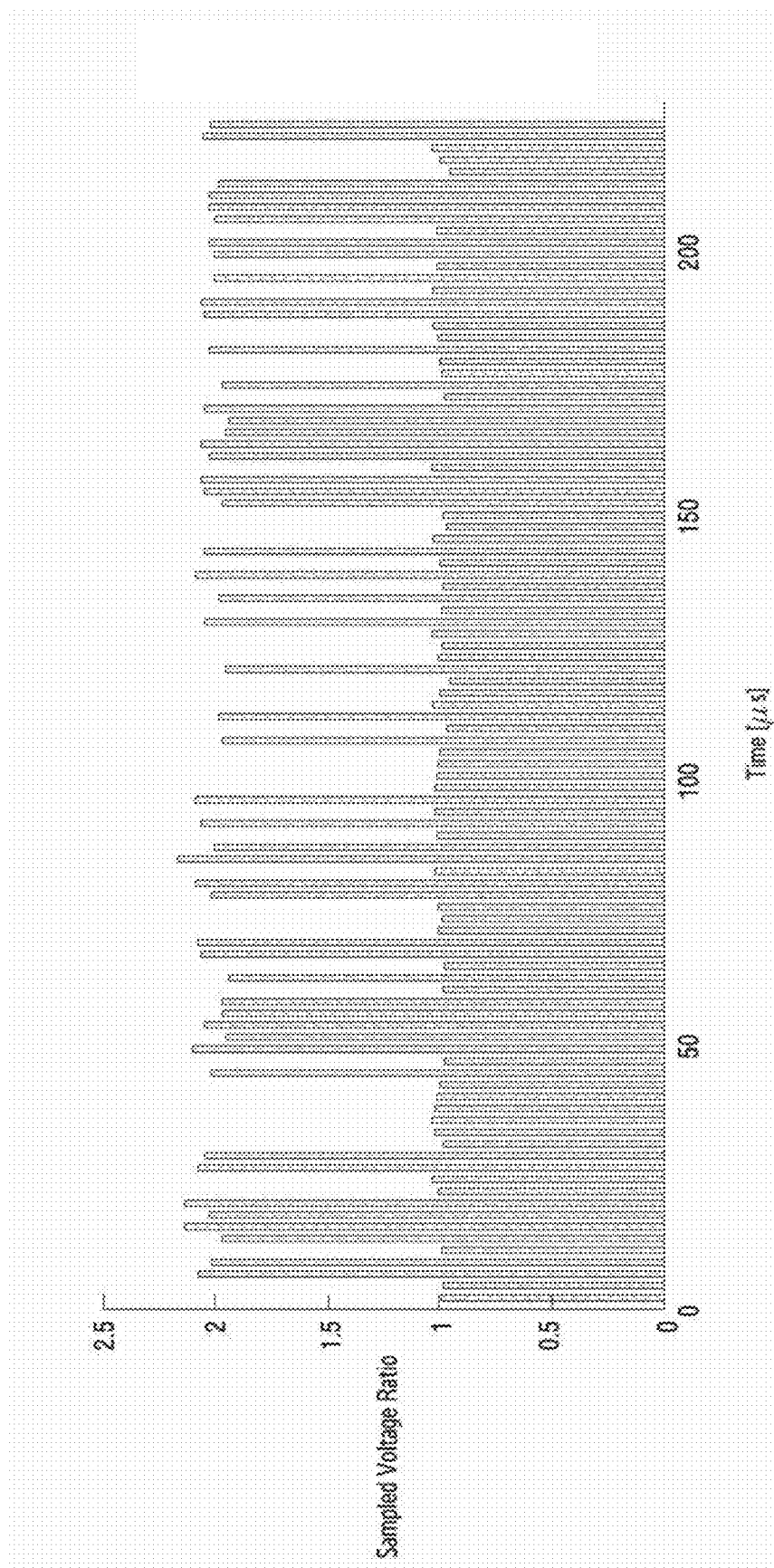

FIGS. 15A to 15D illustrate characteristics of a transmission signal based on a modulation scheme according to an embodiment of the disclosure. Transmission symbols based on ARSK are exemplified in FIG. 15A. A result of rectifying the transmission symbols of FIG. 15A is exemplified in FIG. 15B. Function result values for the transmission symbols of FIG. 15A are exemplified in FIG. 15C. Power that can be used to harvest energy acquired from the transmission symbols of FIG. 15A is exemplified. FIGS. 15A to 15D illustrate an experiment result of an environment in which additional white gaussian noise (AWGN) is added to an environment given in FIG. 11B, FIG. 12B, FIG. 13B, and FIG. 14B, and a signal to noise ratio (SNR) is 10 dB. Referring to FIG. 15A to 15D, a small fluctuation is added to a magnitude of a symbol, a magnitude of a rectified signal, or the like due to an influence of noise. However, the fluctuation is not great enough to have effect on whether information detection and energy harvesting can be performed.

Referring to FIGS. 15A to 15D, a receiving apparatus acquires two rectified signals by forwardly and backwardly rectifying a reception signal, and information is expressed based on a value (e.g., $f(s^+_{dc}, s^-_{dc})$) determined based on the two rectified signals. In case of the aforementioned embodiments, although the information detecting function $f(s^+_{dc}, s^{-dc})$ is exemplified as a ratio of $s^+_{dc}$ and $s^-_{dc}$, the information detecting function may be defined variously.

FIG. 16A to 16G describe various examples of a function of detecting information and a change in a function result value based thereon. FIG. 16A to 16G illustrate an example of function result values for functions for detecting information according to embodiments of the disclosure.

Referring to FIG. 16A to 16G, an environment is assumed in which transmission power $P_T$ is 1 mW, a frequency $f_1$ of a first frequency signal is 900 MHz, a phase θ1 of the first frequency signal is 0, and a frequency $f_2$ of a second frequency signal is 1800 MHz. A transmission signal is defined as shown in Equation 10 below.

$$s(t)=\sqrt{2\alpha P_T}\cos(2\pi f_1 t+\theta_1)+\sqrt{2(1-\alpha)P_T}\cos(2\pi f_2 t+\theta_2) \quad \text{Equation 10}$$

In Equation 10, s(t) denotes a transmission signal, α denotes a power distribution weight, $P_T$ denotes power of the transmission signal, $A_k$ denotes a magnitude of a k-th sinusoidal wave, $f_k$ denotes a frequency of the k-th signal, and $\theta_k$ denotes a phase of the k-th signal.

Figure 16A:
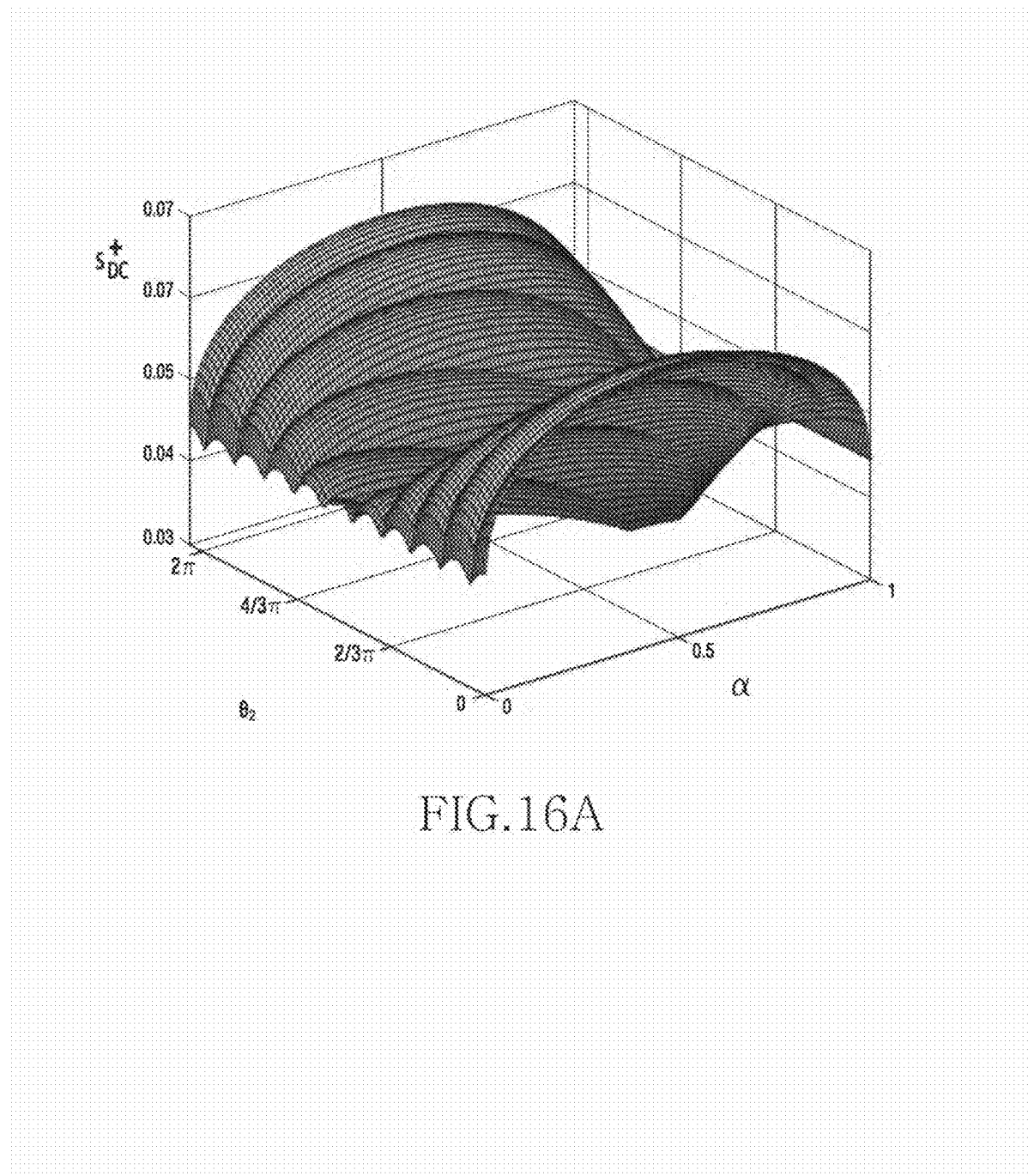
FIGS. 16A, 16B, 16C, 16D, 16E, 16F, and 16G illustrate an example of function result values for functions for detecting information according to embodiments of the disclosure.
Figure 16B:
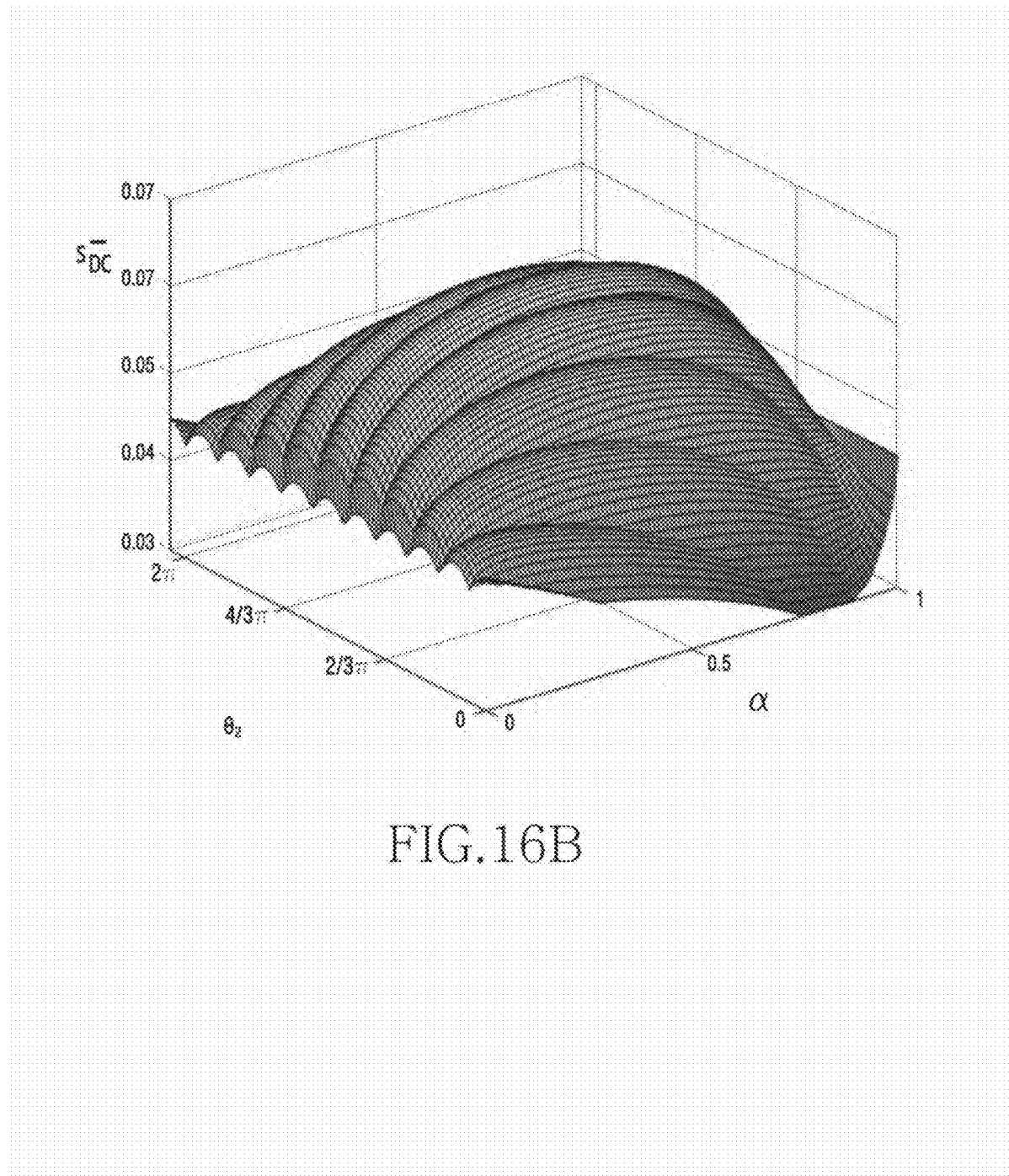
Figure 16C:
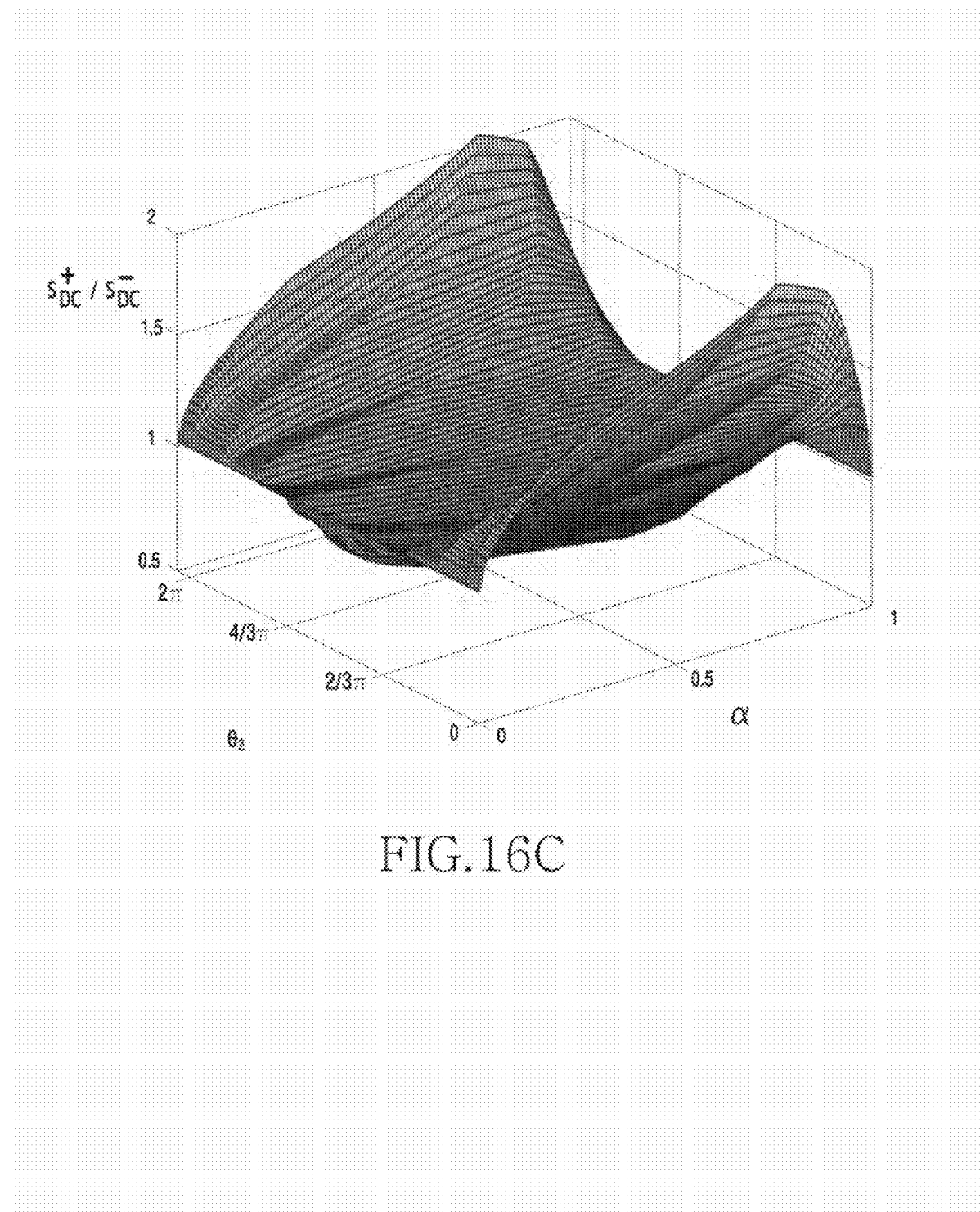
Figure 16D:
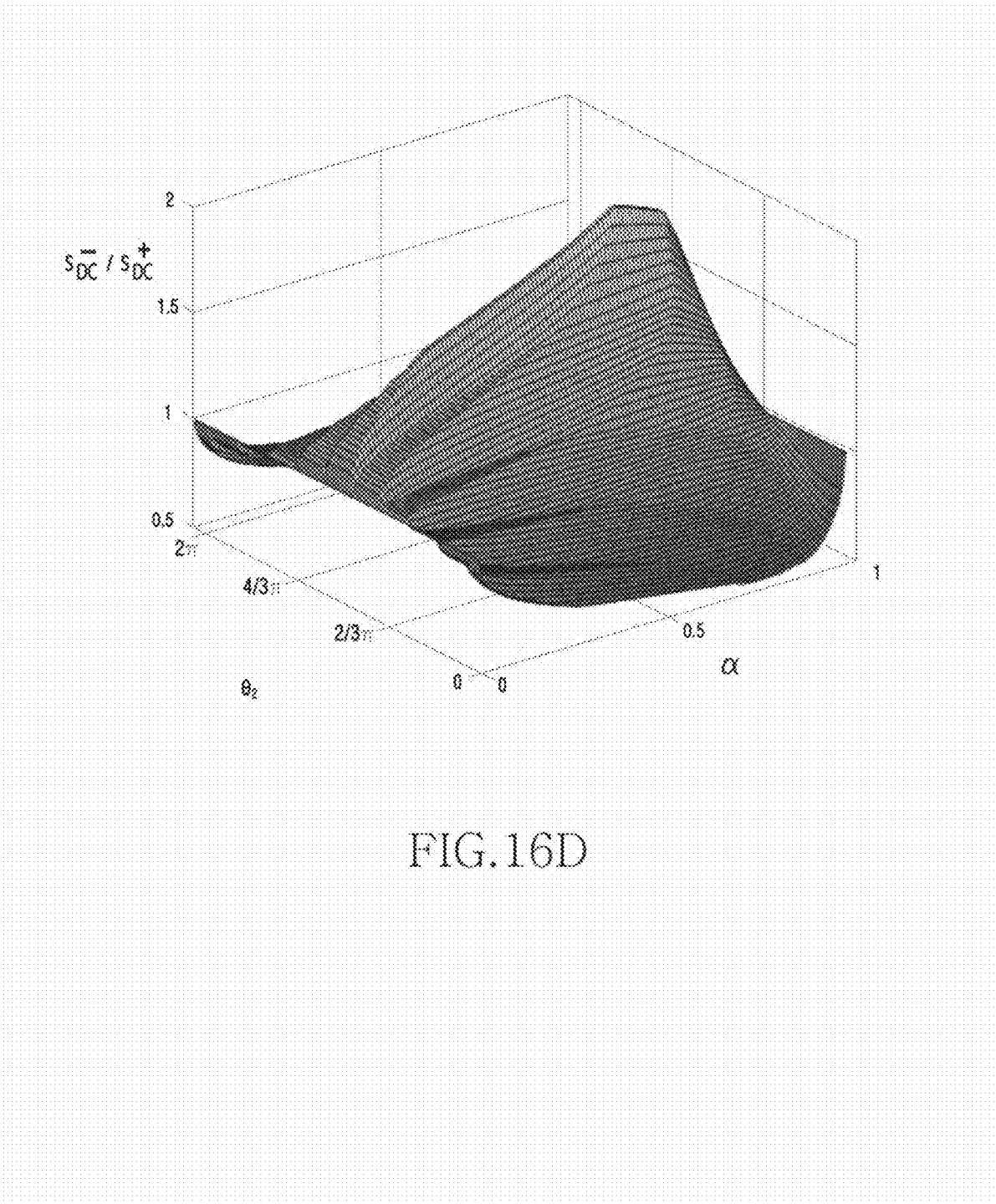
Figure 16E:
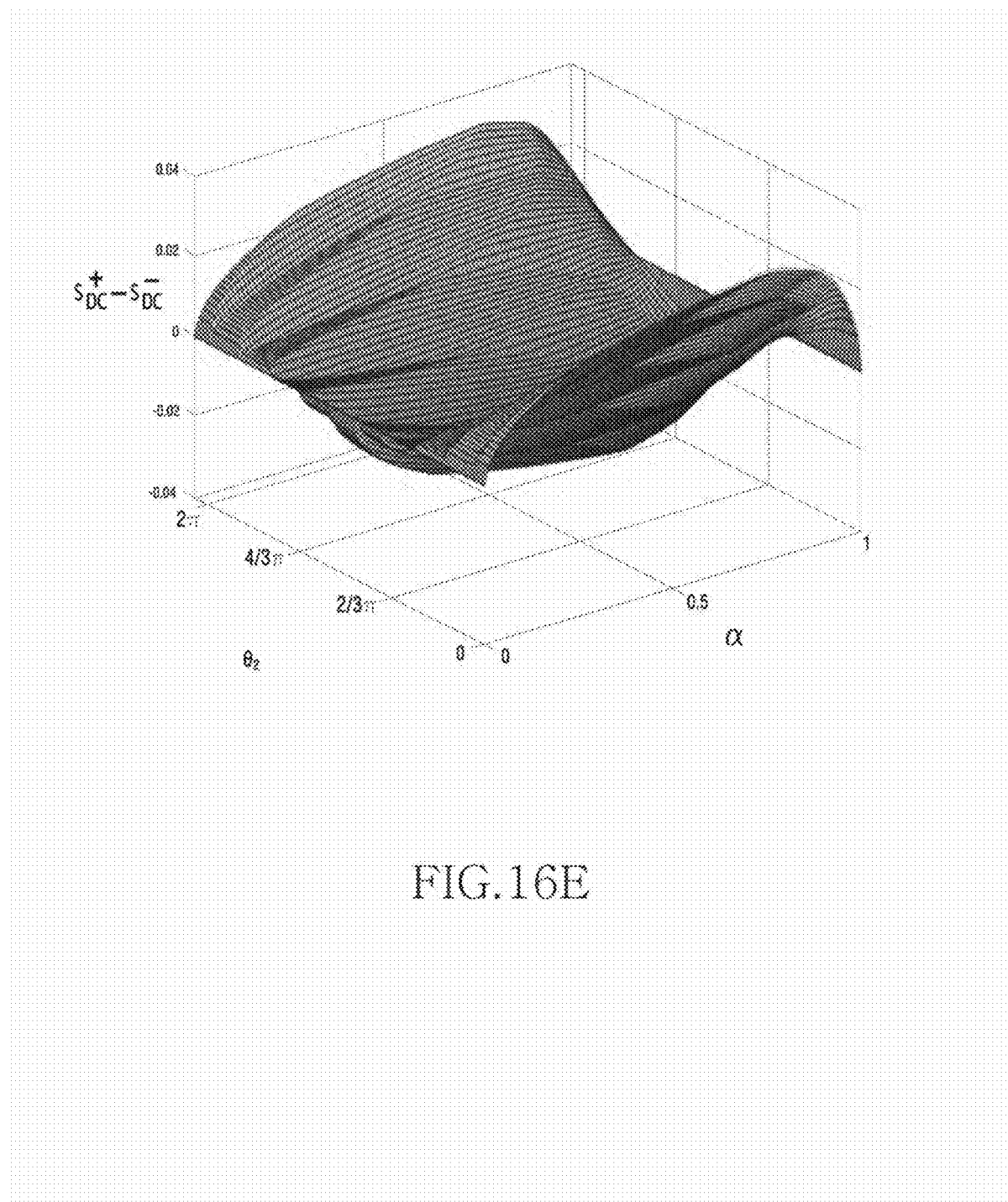
Figure 16F:
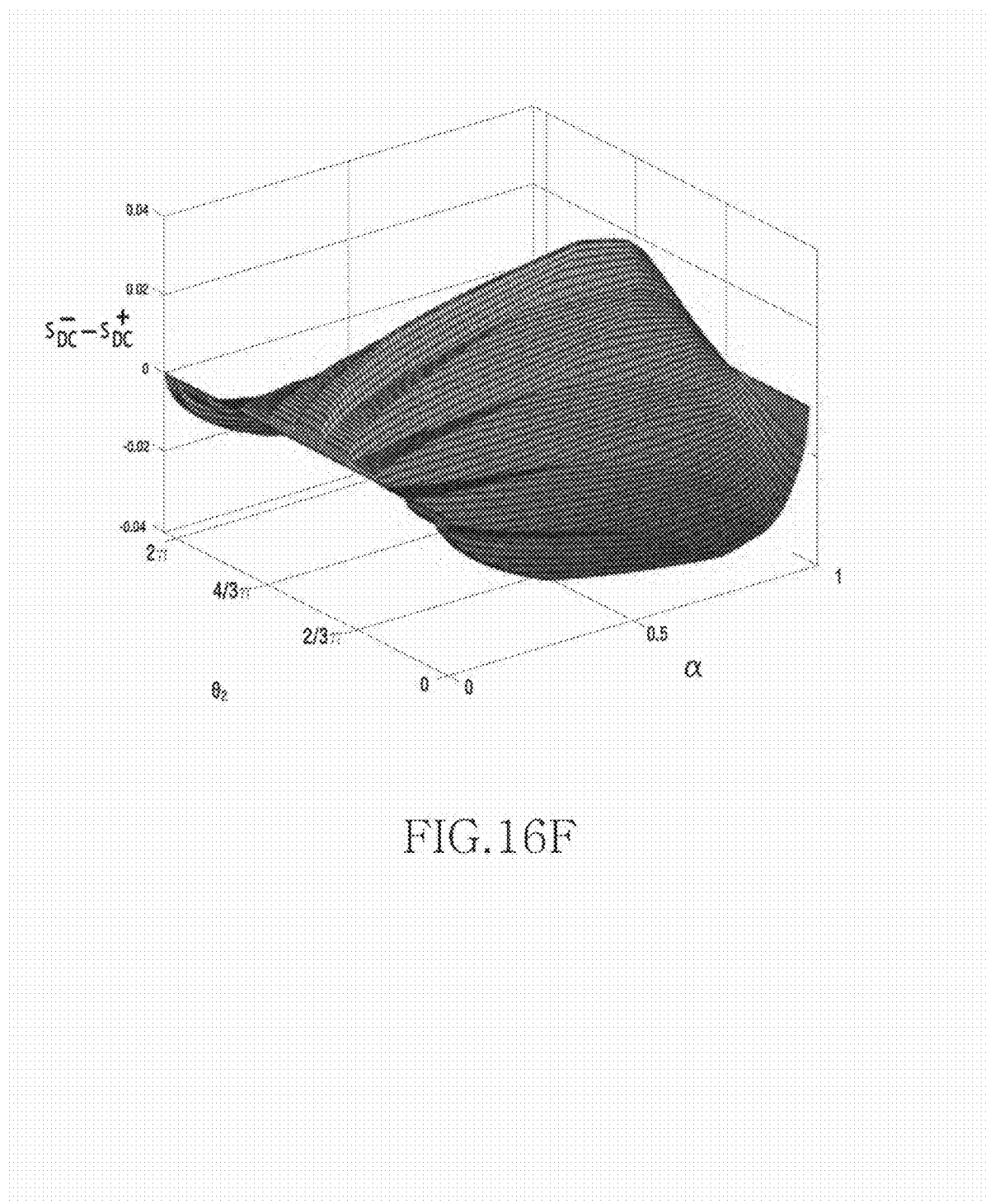
Figure 16G:
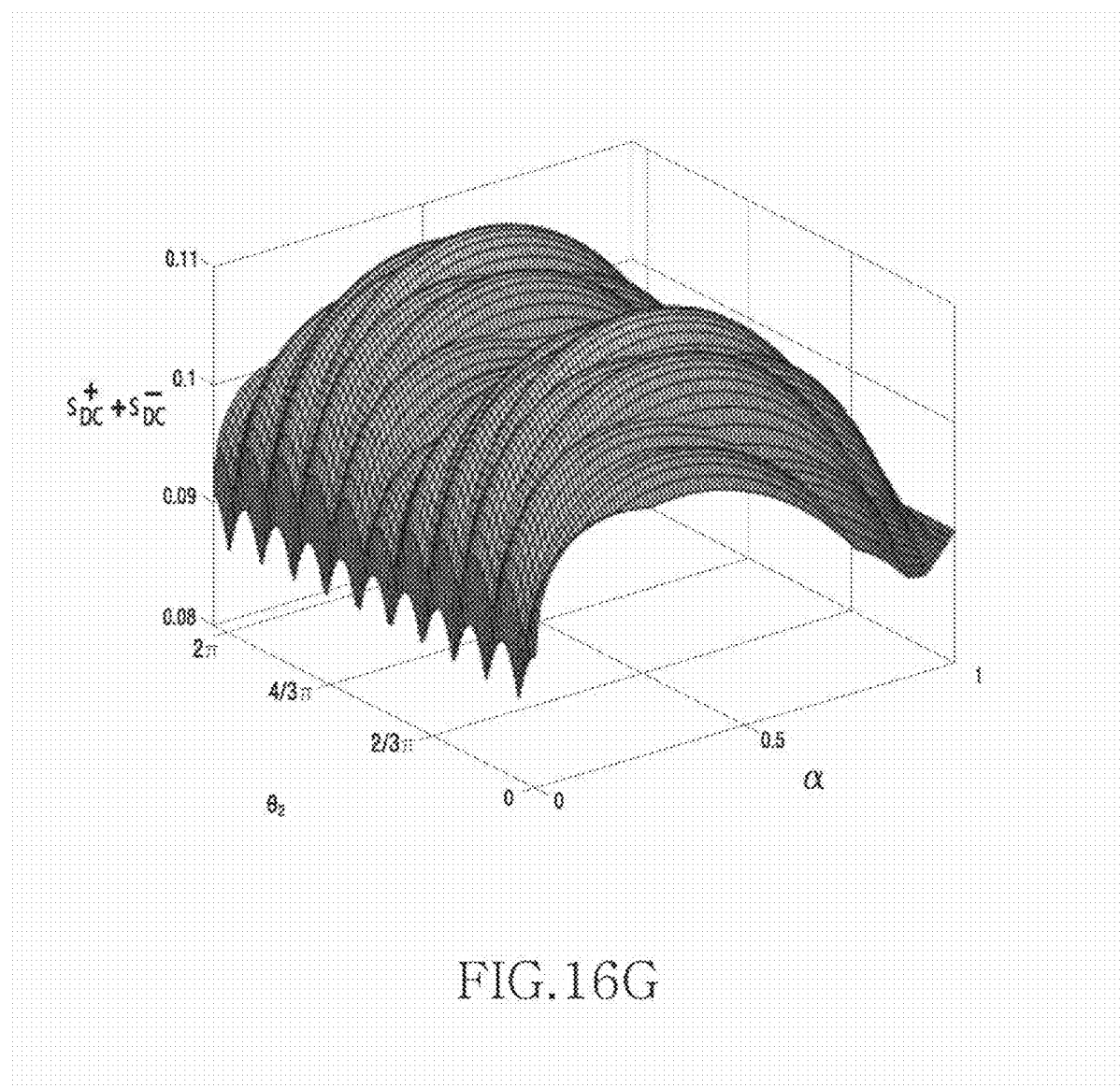

In FIGS. 16A to 16G, a change in a function result value based on a phase $\theta_2$ of a second frequency signal and a power distribution weight α is illustrated for each of information detecting functions defined variously. A function $f(s^+_{dc}, s^-_{dc})$ for detecting information is defined as $s^+_{dc}$ in FIG. 16A, $s^-_{dc}$ in FIG. 16B, $s^+_{dc} \cdot s^-_{dc}$) FIG. 16C, $s^-_{dc}/s^+_{dc}$ in FIG. 16D, $s^+_{dc}-s^-_{dc}$ in FIG. 16E, $s^-_{dc}-s^+_{dc}$ in FIG. 16F, and $s^+_{dc}+s^-_{dc}$ in FIG. 16G. In FIG. 16A to FIG. 16G, the power distribution weight α changes in a range of 0 to 1, and the phase $θ_2$ of the second frequency signal changes in a range of 0 to 2π. In FIG. 16C, when the power distribution weight is fixed to 0.8, a graph of FIG. 9 is acquired. In addition, in FIG. 16C, when the phase $θ_2$ of the second frequency signal is fixed, a graph of FIG. 10 is acquired.

Referring to FIGS. 16A to 16G, it can be seen that a function result value varies depending on a change in the power distribution weight α and the phase $θ_2$ of the second frequency signal. A pattern of the change in the function result value varies depending on a definition of a detailed information detecting function. Therefore, mapping between symbols and a combination of the power distribution weight α and the phase $θ_2$ of the second frequency signal may be defined differently according to the definition of the information detecting function. For example, the mapping between the symbols and the combination of the power distribution weight α and the phase $0_2$ of the second frequency signal may be defined based on a difference between the function result values corresponding to the symbols (e.g., such that a difference, an average of differences, or a dispersion of the differences is maximized). In addition to the 7 definitions exemplified in FIGS. 16A to 16G, the information detecting function may be defined variously.

Figure 17B:
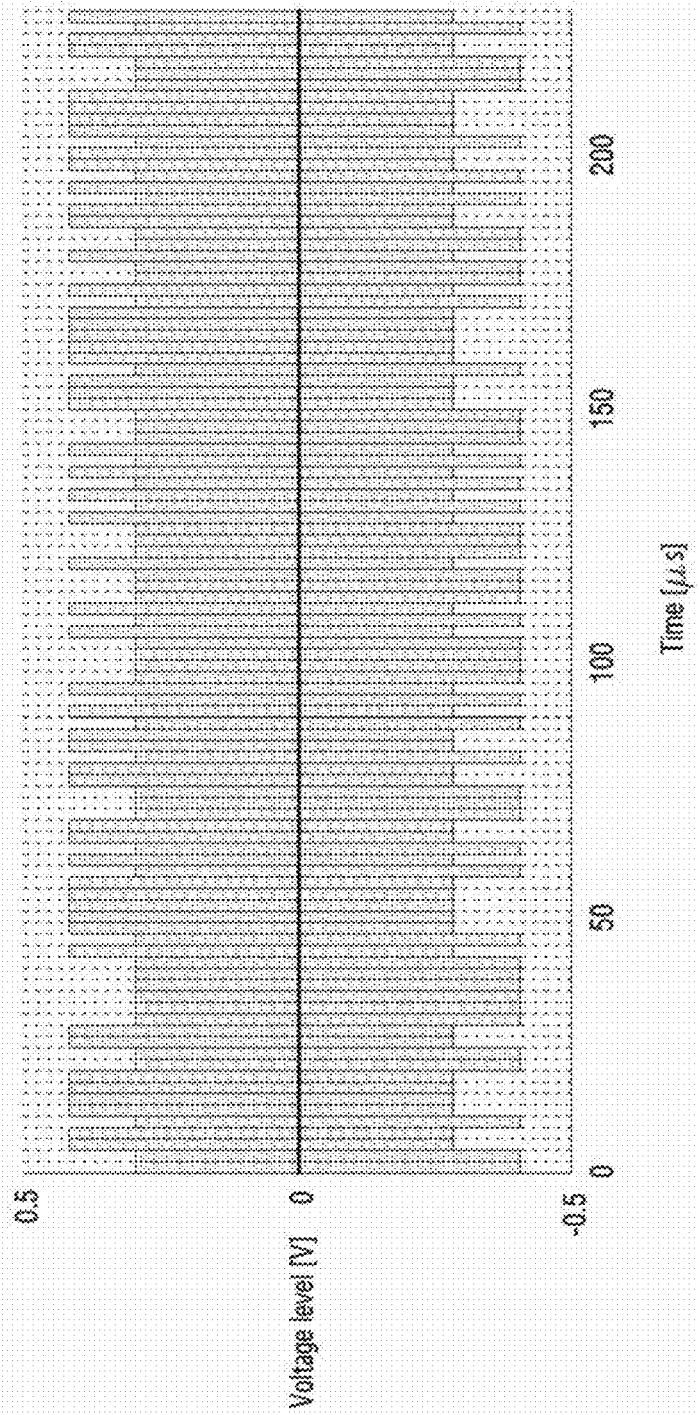
Figure 17C:
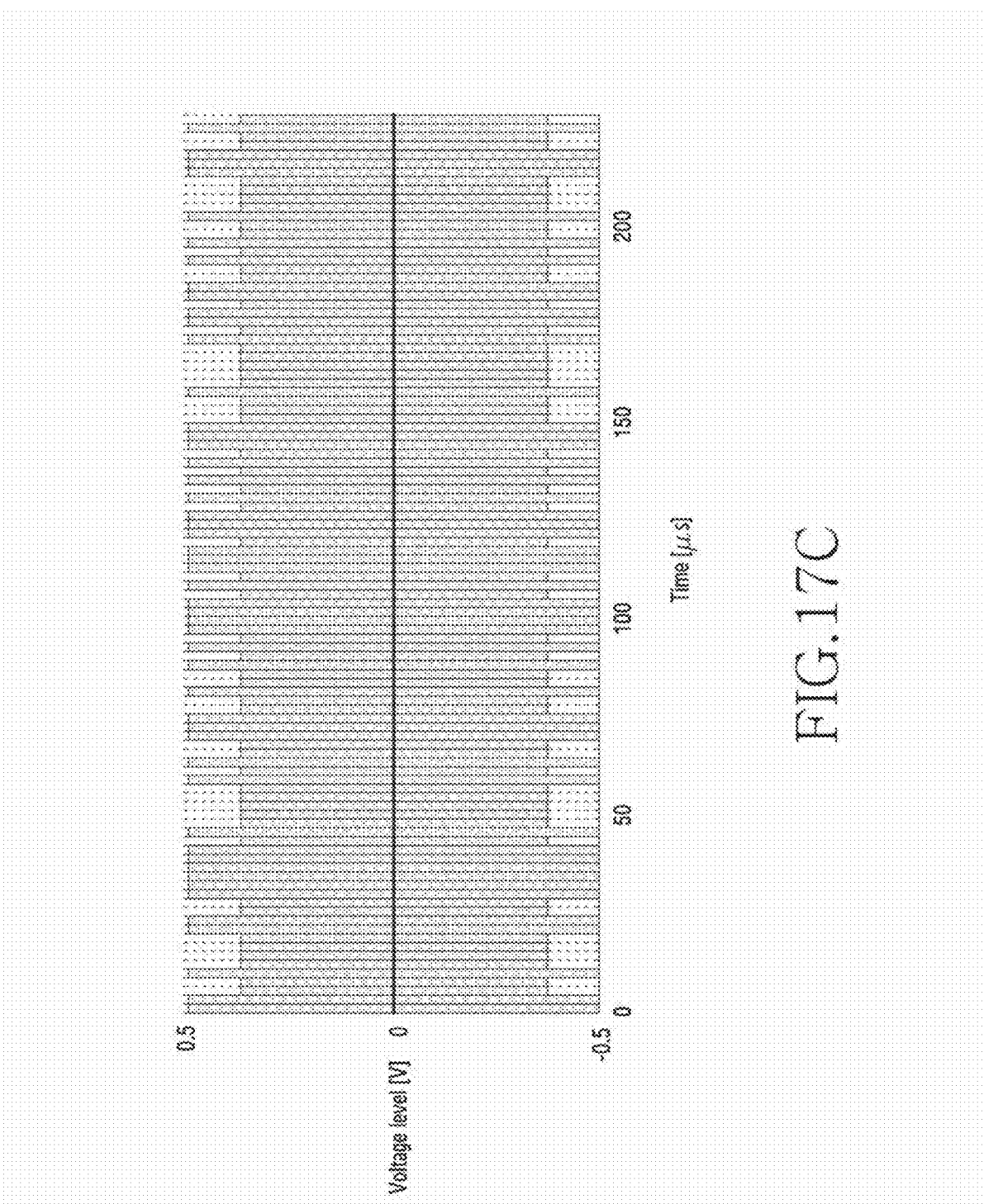

FIGS. 17A to 17C illustrate examples of transmission symbols according to various embodiments of the disclosure. Examples of transmission symbols based on information detecting functions defined to be different from each other are illustrated in FIGS. 17A to 17C. The information detecting function is defined as $s^+_{dc}-s^-_{dc}$ in FIG. 17A, $s^-_{dc}-s^+_{dc}$, in FIG. 17B, and $s^+_{dc}+s^-_{dc}$, in FIG. 17C. In each of FIG. 17A to FIG. 17C, combinations of a phase $θ_2$ of a second frequency signal and a power distribution weight a, which define two transmission symbols, are selected at a point where a function result value is maximized and at a point where the function result value is smallest.

Referring to FIGS. 17A to 17C, it can be seen that, although the information detecting functions are defined differently, transmission symbols are transmitted with power greater than or equal to a specific level even if an information value changes.

According to the aforementioned various embodiments, a transmission signal capable of expressing information may be generated while maintaining power with at least a specific level. Accordingly, the transmitting apparatus may transmit information and power, and in this case, the power may be maintained with at least a specific level. As a result, the receiving apparatus may harvest the power with at least the specific level irrespective of the information value. The aforementioned technique of simultaneously transmitting information and power may be utilized in various technical fields. Hereinafter, examples of applying the technique for simultaneously transmitting information and power are described with reference to FIG. 18 to FIG. 20.

Figure 18:
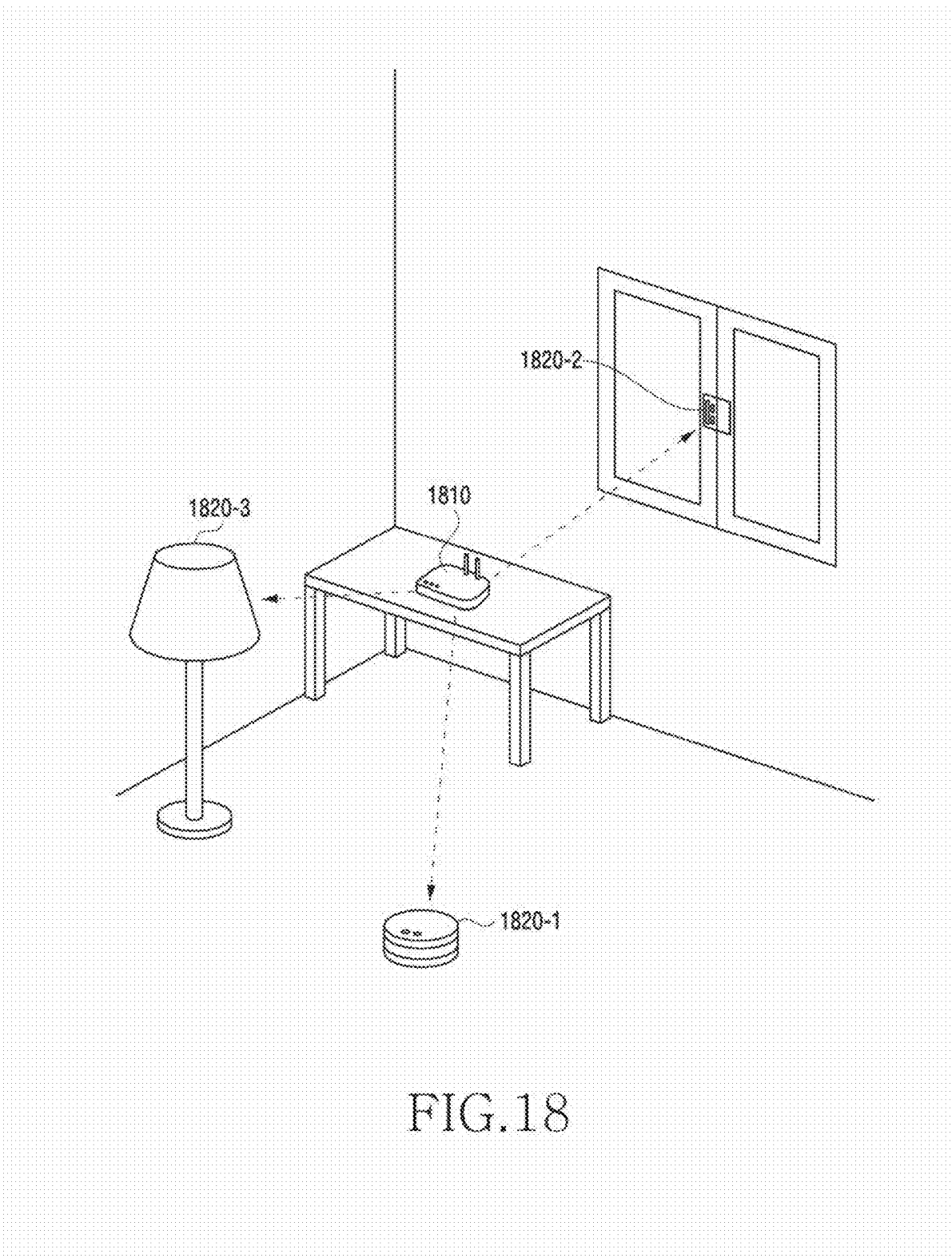
FIG. 18 illustrates an example of utilizing a technique for simultaneously transmitting information and power according to an embodiment of the disclosure.

FIG. 18 illustrates an example of utilizing a technique for simultaneously transmitting information and power according to various embodiments of the disclosure. A case of applying the technique for simultaneously transmitting information and power to a home network is exemplified in FIG. 18.

Referring to FIG. 18, an access point (AP) 1810 is disposed indoors. In addition to the AP 1810, various smart devices are disposed, such as a robot cleaner 1820-1, a remote window opening/closing device 1820-2, and a remote control stand 1820-3. The AP 1810 includes a transmitting apparatus (e.g., the transmitting apparatus 210) capable of simultaneously transmitting information and power, and each of the robot cleaner 1820-1, the remote window opening/closing device 1820-2, and the remote control stand 1820-3 includes a receiving apparatus (e.g., the receiving apparatus 220) capable of simultaneously receiving information and power. Accordingly, the AP 1810 may transmit energy as well as data to other smart devices (e.g., the robot cleaner 1820-1, the remote window opening/closing device 1820-2, and the remote control stand 1820-3). Accordingly, it is possible to reduce user's inconvenience of frequently connecting the devices to a charger to manually charge the devices.

Figure 19:
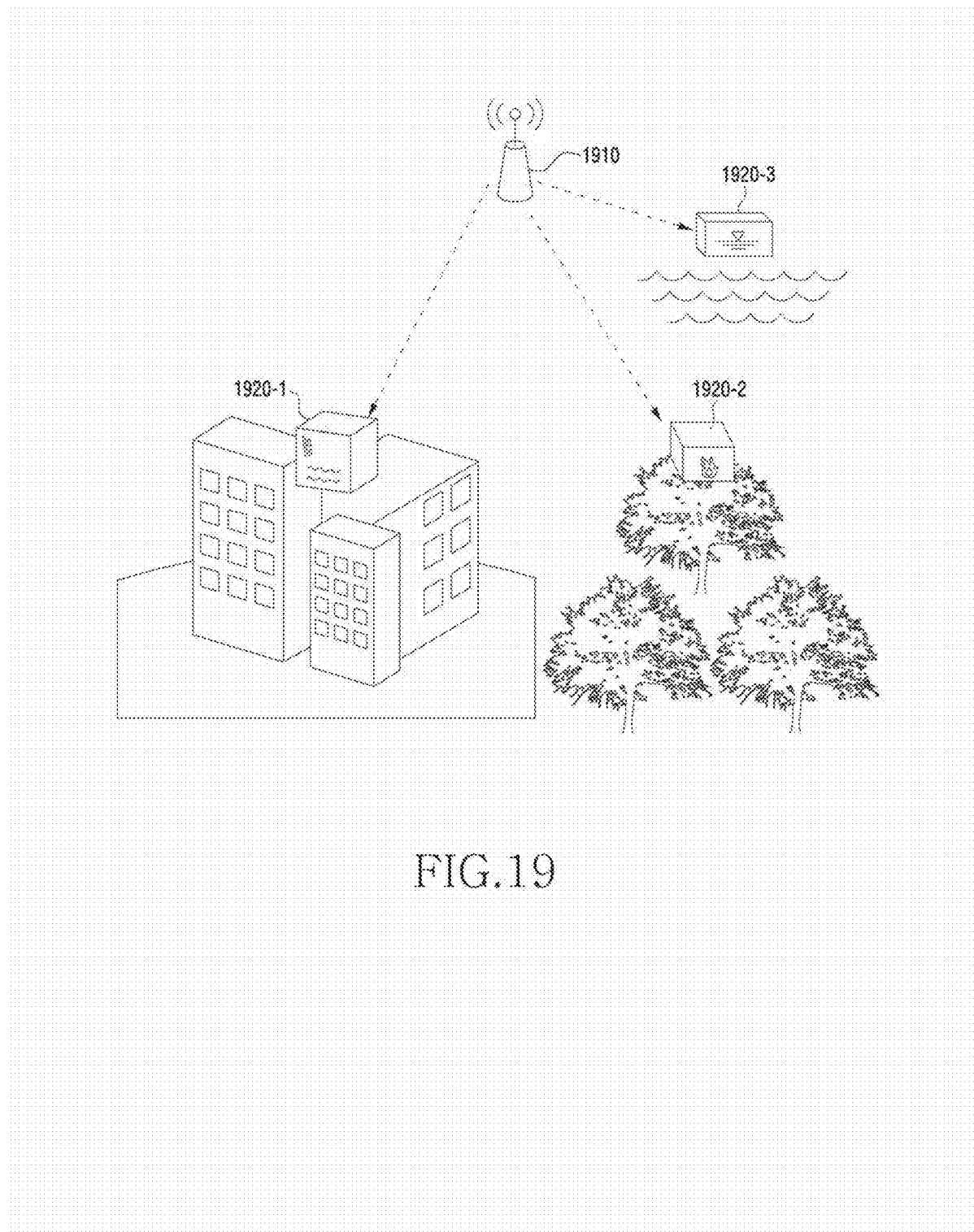
FIG. 19 illustrates an example of utilizing a technique of simultaneously transmitting information and power according to an embodiment of the disclosure.

FIG. 19 illustrates another example of utilizing a technique of simultaneously transmitting information and power according to an embodiment of the disclosure. A case of applying the technique of simultaneously transmitting information and power to a disaster detection system is exemplified in FIG. 19.

Referring to FIG. 19, an earthquake sensor 1920-1 is installed in an area where buildings are crowded, a fire sensor 1920-2 is installed in an area where many trees are present, and a flood warning sensor 1920-3 is installed on a river. A base station 1910 controls sensors 1920-1 to 1920-3 and receives sensing data by performing wireless communication with the earthquake sensor 1920-1, the fire sensor 1920-2, and the flood warning sensor 1920-3. The sensors 1920-1 to 1920-3 may use a battery according to an environmental characteristic, and cannot perform a sensing operation when the battery is consumed. In this case, replacement of the battery is required. However, it is cumbersome and costly to collect all of the sensors distributed to a wide region or to replace the battery in an installation place. Therefore, in case of applying the aforementioned technique of simultaneously transmitting information and power, the base station 1910 transmits power when data is transmitted to the earthquake sensor 1920-1, the fire sensor 1920-2, and the flood warning sensor 1920-3, thereby capable of charging the battery of the sensors 1920-1 and 1920-3.

Figure 20:
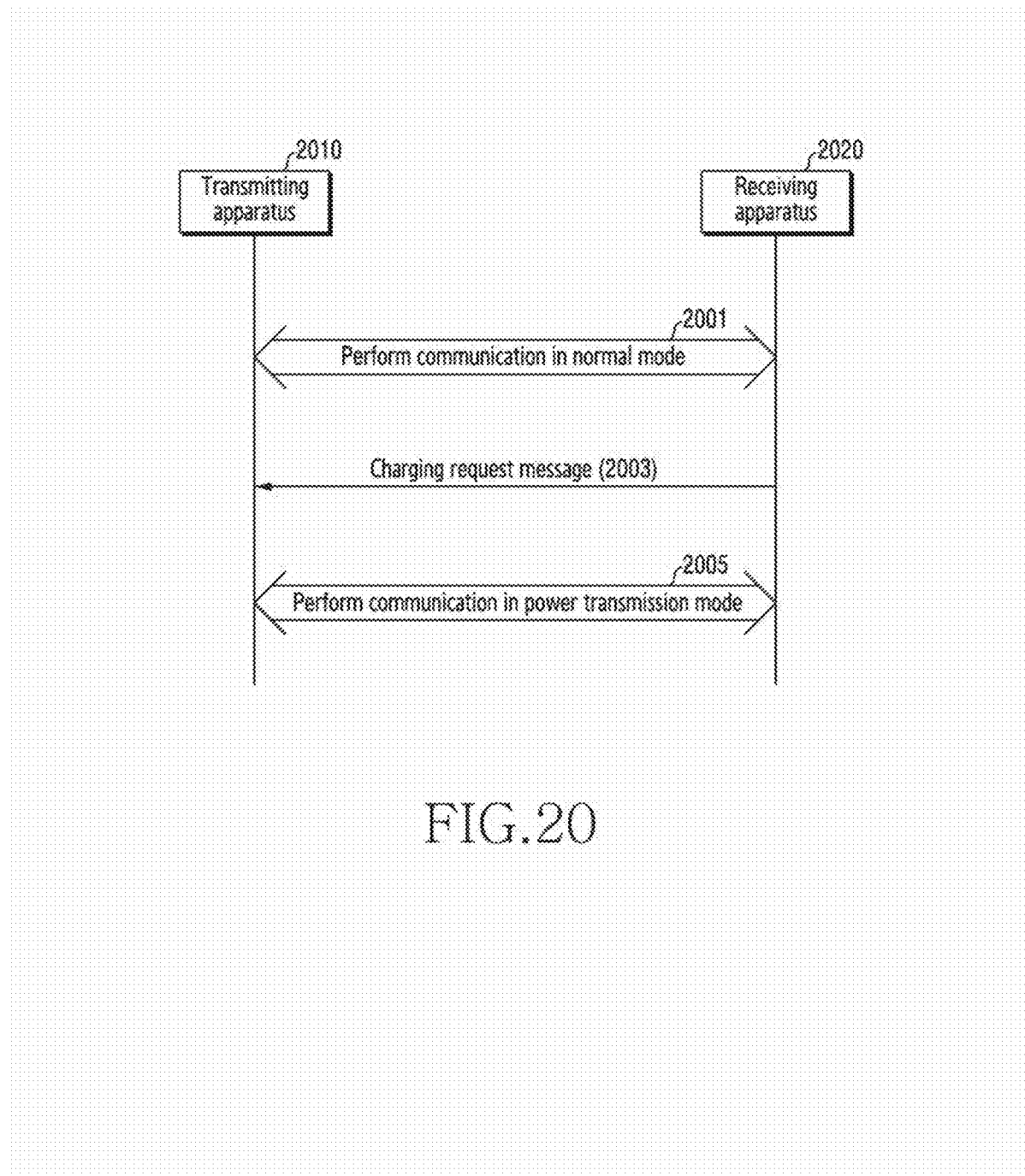
FIG. 20 illustrates an example of utilizing a technique of simultaneously transmitting information and power according to an embodiment of the disclosure.

FIG. 20 illustrates another example of utilizing a technique of simultaneously transmitting information and power according to an embodiment of the disclosure. A case of selectively transmitting power is exemplified in FIG. 20.

Referring to FIG. 20, in operation 2001, a transmitting apparatus 2010 and a receiving apparatus 2020 perform communication in a normal mode. The normal mode is an operating state in which only data is transmitted and received without transmission of power. In operation 2003, the receiving apparatus 2020 transmits a charging request message to the transmitting apparatus 2010. In operation 2005, the transmitting apparatus 2010 and the receiving apparatus 2020 perform communication in a power transmission mode. The power transmission mode is an operating state in which data and power are transmitted and received together by using the aforementioned technique of simultaneously transmitting information and power.

According to the procedure of FIG. 20, a receiving apparatus having a function of simultaneously receiving information and power may identify a remaining energy amount thereof, and if the remaining energy amount is less than a specific level, may request the transmitting apparatus (e.g., a base station, a router, a gateway, etc.) having the function of simultaneously transmitting information and power to charge energy. Accordingly, the transmitting apparatus provides the power. In addition, the transmitting apparatus may more effectively transmit the power by performing beamforming toward a corresponding receiving apparatus. When a plurality of receiving apparatuses are present, proper scheduling may be involved.

Methods based on the embodiments disclosed in the claims and/or specification of the disclosure can be implemented in hardware, software, or a combination of both.

When implemented in software, computer readable recording medium for storing one or more programs (i.e., software modules) can be provided. The one or more programs stored in the computer readable recording medium are configured for execution performed by one or more processors in the electronic device. The one or more programs include instructions for allowing the electronic device to execute the methods based on the embodiments disclosed in the claims and/or specification of the disclosure.

The program (i.e., the software module or software) can be stored in a random access memory, a non-volatile memory including a flash memory, a read only memory (ROM), an electrically erasable programmable read only memory (EEPROM), a magnetic disc storage device, a compact disc-ROM (CD-ROM), digital versatile discs (DVDs) or other forms of optical storage devices, and a magnetic cassette. Alternatively, the program can be stored in a memory configured in combination of all or some of these storage media. In addition, the configured memory can be plural in number.

Further, the program can be stored in an attachable storage device capable of accessing the electronic device through a communication network such as the Internet, an Intranet, a local area network (LAN), a wide LAN (WLAN), or a storage area network (SAN) or a communication network configured by combining the networks. The storage device can have an access to a device for performing an embodiment of the disclosure via an external port. In addition, an additional storage device on a communication network can have an access to the device for performing the embodiment of the disclosure.

In the aforementioned specific embodiments of the disclosure, a component included in the disclosure is expressed in a singular or plural form according to the specific example embodiment proposed herein. However, the singular or plural expression is selected properly for a situation proposed for the convenience of explanation, and thus the various embodiments of the disclosure are not limited to a single or a plurality of components. Therefore, a component expressed in a plural form can also be expressed in a singular form, or vice versa.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. A transmitting apparatus in a wireless communication system, comprising:
   a transceiver; and
   at least one processor coupled with the transceiver,
   wherein the at least one processor is configured to:
      generate a symbol including a sum of signals for transferring power, the symbol indicating an information value among a plurality of candidate values, and
      transmit the symbol,
   wherein the information value is identified base on a function of a first magnitude value of a first rectified signal acquired by forwardly rectifying the symbol and a second magnitude value of a second rectified signal acquired by reversely rectifying the symbol,
   wherein an amount of power transferred by the symbol is determined based on electric potential difference of the first rectified signal and the second rectified signal, and
   wherein the signals are different in at least one of transmission powers, frequencies, magnitudes, or phases of the signals included in the symbol.

2. The transmitting apparatus of claim 1, wherein in the symbol has a same transmission power regardless of which information value is indicated by the symbol.

3. The transmitting apparatus of claim 1, wherein the function includes one of:
   a ratio of the first magnitude value to the second magnitude value,
   a ratio of the second value to the first magnitude value,
   the first magnitude value,
   the second magnitude value,
   subtracting the second value from the first magnitude value,
   subtracting the first value from the second magnitude value, or
   summing the first value and the second magnitude value.

4. The transmitting apparatus of claim 1, wherein the transmission power, the frequencies, magnitudes, or phases of the signals are determined such that a difference between result values of the function that correspond to the plurality of candidate values is maximized.

5. The transmitting apparatus of claim 1, wherein the at least one processor is further configured to operate the transmitting apparatus in one of a normal mode in which only data is transmitted or a power transmission mode in which both data and power are received.

6. The transmitting apparatus of claim 5, wherein the at least one processor is further configured to operate the transmitting apparatus in the power transmission mode in response to receiving a request from a receiving apparatus.

7. A receiving apparatus in a wireless communication system, comprising:
   a transceiver; and
   at least one processor coupled with the transceiver,
   wherein the at least one processor is configured to:
      receive a symbol including a sum of signals for transferring power, the symbol indicating an information value among a plurality of candidate values,
      detect the information value from the symbol, and
      harvest the power from the symbol,
   wherein the information value is identified based on a function of a first magnitude value of a first rectified signal acquired by forwardly rectifying the symbol and a second magnitude value of a second rectified signal acquired by reversely rectifying the symbol,
   wherein an amount of power transferred by the symbol is determined based on electric potential difference of the first rectified signal and the second rectified signal, and
   wherein the signals are different in at least one of transmission powers, frequencies, magnitudes, or phases of the signals included in the symbol.

8. The receiving apparatus of claim 7, wherein in the symbol has a same transmission power regardless of which information value is indicated by the symbol.

9. The receiving apparatus of claim 7, wherein the predefined rule includes one of:

a ratio of the first magnitude value to the second magnitude value, a ratio of the second magnitude value to the first magnitude value, the first magnitude value, the second magnitude value, subtracting the second magnitude value from the first magnitude value, subtracting the first magnitude value from the second magnitude value, or summing the first magnitude value and the second magnitude value.

10. The receiving apparatus of claim 7, wherein the transmission power, the frequencies, magnitudes, or phases of the signals are determined such that a difference between result values of the function that correspond to the plurality of candidate values is maximized.

11. The receiving apparatus of claim 7, wherein the at least one processor is further configured to:

forwardly rectify the symbol to determine the first magnitude value; and backwardly rectify the symbol to determine the second magnitude value.

12. The receiving apparatus of claim 11, wherein the at least one processor is further configured to transmit a request for the power transmission mode.

13. The receiving apparatus of claim 12, wherein the request is transmitted, if a remaining energy amount of the receiving apparatus is less than a threshold.

14. A method for operating a receiving apparatus in a wireless communication system, the method comprising:

receiving a symbol including a sum of signals for transferring, the symbol indicating an information value among a plurality of candidate values;

detecting the information value from the symbol; and harvesting the power from the symbol, wherein the information value is identified based on a function first magnitude value of a first rectified signal acquired by forwardly rectifying the symbol and a second magnitude value of a second rectified signal acquired by reversely rectifying the symbol, and wherein the signals are different in at least one of transmission powers, frequencies, magnitudes, or phases of the signals included in the symbol.

15. The method of claim 14, wherein in the symbol has a same transmission power regardless of which information value is indicated by the symbol.

16. The method of claim 14, wherein the function includes one of:

a ratio of the first magnitude value to the second magnitude value, a ratio of the second magnitude value to the first magnitude value, the first magnitude value, the second magnitude value, subtracting the second magnitude value from the first magnitude value, subtracting the first magnitude value from the second magnitude value, or summing the first magnitude value and the second magnitude value.

17. The method of claim 14, wherein the transmission power, the frequencies, magnitudes, or phases of the signals are determined such that a difference between result values of the function that correspond to the plurality of candidate values is maximized.

18. The method of claim 14, further comprising:

forwardly rectifying the symbol to determine the first magnitude value; and backwardly rectifying the symbol to determine the second magnitude value.

19. The method of claim 14, further comprising:

transmitting a request for a power transmission mode, if a remaining energy amount of the receiving apparatus is less than a threshold.

* * * * *